United States Patent
Matsuda et al.

(10) Patent No.: US 9,077,827 B2
(45) Date of Patent: Jul. 7, 2015

(54) PAGE-TURNING READER DEVICE AND FEEDER DEVICE

(75) Inventors: Mitsuyoshi Matsuda, Yamato (JP); Norichika Hirohashi, Yamato (JP); Naoki Komuro, Yamato (JP); Yutaka Sasaki, Yamato (JP)

(73) Assignee: Cosmograph Inc., Kanagawa (JP)

( * ) Notice: Subject to any disclaimer, the term of this patent is extended or adjusted under 35 U.S.C. 154(b) by 0 days.

(21) Appl. No.: 14/350,993

(22) PCT Filed: May 22, 2012

(86) PCT No.: PCT/JP2012/063101
§ 371 (c)(1),
(2), (4) Date: May 21, 2014

(87) PCT Pub. No.: WO2013/054566
PCT Pub. Date: Apr. 18, 2013

(65) Prior Publication Data
US 2014/0268257 A1   Sep. 18, 2014

(30) Foreign Application Priority Data
Oct. 12, 2011   (JP) .................................. 2011-225119

(51) Int. Cl.
*H04N 1/04*   (2006.01)
*H04N 1/00*   (2006.01)
(Continued)

(52) U.S. Cl.
CPC ................ *H04N 1/0032* (2013.01); *B42D 9/04* (2013.01); *H04N 1/00567* (2013.01);
(Continued)

(58) Field of Classification Search
CPC ............ B42D 9/04; B42D 25/24; B42D 9/06; B41J 3/283; B41J 3/44; H04N 1/0032; H04N 1/00567; H04N 2201/0081; H04N 2201/0084; H04N 2201/0434
USPC .......................... 358/1.12, 498, 474, 497, 496
See application file for complete search history.

(56) References Cited

U.S. PATENT DOCUMENTS 5,390,033 A * 2/1995 Bannai et al. .................. 358/498
5,471,277 A * 11/1995 Fujioka et al. ................... 355/25
(Continued)

FOREIGN PATENT DOCUMENTS

| JP | 62-140949 | 6/1987 |
| JP | 02-023133 | 1/1990 |

(Continued)

OTHER PUBLICATIONS

First Examination Report from Republic of China Intellectual Property Office in the corresponding R.O.C. application 10321638760 dated Nov. 24, 2014, 8 pp. in Chinese.

*Primary Examiner* — Negussie Worku
(74) *Attorney, Agent, or Firm* — Juan Carlos A. Marquez; Bacon & Thomas PLLC

(57) ABSTRACT

In order to provide a page-turning reader device and a feeder device capable of continuously acquiring image data of each page of a plurality of booklets, the page-turning reader device (1) includes a feeder unit (102) that feeds a plurality of stacked booklets (10) one by one from a lower side; a holder (203) that grips and fixes a binding edge of the booklet (10) fed from the feeder unit (102); an air suction pad (206), an air blow nozzle (207), and a first page-turning bar (204) configured to turn the pages of the booklet (10) one by one while the booklet (10) is fixed by the holder (203); and an image data acquiring means (11) that acquires image data of each page of the booklet (10) using an image pickup camera (106) in synchronization with a turning operation.

18 Claims, 27 Drawing Sheets

(51) Int. Cl.
*B42D 9/04* (2006.01)
*B65H 3/06* (2006.01)
*B65H 3/52* (2006.01)
*B65H 5/02* (2006.01)

(52) U.S. Cl.
CPC ............. *H04N 2201/0434* (2013.01); *H04N 2201/0081* (2013.01); *H04N 2201/0084* (2013.01); *B65H 3/063* (2013.01); *B65H 3/523* (2013.01); *B65H 5/021* (2013.01); *B65H 2701/1932* (2013.01)

(56) References Cited

U.S. PATENT DOCUMENTS

| | | | |
|---|---|---|---|
| 6,762,356 B2 * | 7/2004 | McNab et al. | 84/486 |
| 6,935,058 B2 * | 8/2005 | Sadegh et al. | 40/531 |
| 7,557,965 B2 * | 7/2009 | Taylor et al. | 358/474 |
| 7,714,221 B2 * | 5/2010 | Ishioka | 84/519 |
| 7,874,749 B2 * | 1/2011 | Kimura | 400/24 |
| 8,227,680 B2 * | 7/2012 | Ishioka | 84/486 |
| 8,231,286 B2 * | 7/2012 | Sapir-Haim et al. | 400/28 |
| 8,388,245 B2 * | 3/2013 | Sapir-Haim et al. | 400/28 |
| 8,491,207 B2 * | 7/2013 | Ishioka | 400/24 |
| 8,680,384 B2 * | 3/2014 | Ishioka | 84/487 |
| 8,696,224 B2 * | 4/2014 | Kanda et al. | 400/24 |
| 8,796,526 B2 * | 8/2014 | Kanda | 84/486 |
| 2003/0063334 A1 * | 4/2003 | Mandel et al. | 358/474 |
| 2003/0063335 A1 * | 4/2003 | Mandel et al. | 358/498 |

FOREIGN PATENT DOCUMENTS

| | | |
|---|---|---|
| JP | 03-113338 | 5/1991 |
| JP | 03-128852 | 5/1991 |
| JP | 04-085238 | 3/1992 |
| JP | 04-319494 | 11/1992 |
| JP | 05-338849 | 12/1993 |
| JP | 07-131603 | 5/1995 |
| JP | 07-184008 | 7/1995 |
| JP | 08-245001 | 9/1996 |
| JP | 10-114172 | 5/1998 |
| JP | H10-114175 A | 5/1998 |
| JP | 11-242364 | 9/1999 |
| JP | 11-301143 | 11/1999 |
| JP | 2001-071575 | 3/2001 |
| JP | 2001-071575 A | 3/2001 |
| JP | 2004-146930 | 5/2004 |
| JP | 2004-146930 A | 5/2004 |
| JP | 2007-076844 | 3/2007 |
| JP | 2009-279925 | 12/2009 |
| JP | 2010-208756 | 9/2010 |
| JP | 2010-228351 | 10/2010 |

* cited by examiner

PAGE-TURNING READER DEVICE AND FEEDER DEVICE

TECHNICAL FIELD

The present invention relates to a page-turning reader device and a feeder device capable of turning pages of a plurality of booklets and acquiring image data of each page.

BACKGROUND ART

In the related art, there is known a page-turning device that acquires image data of booklets such as books or documents while pages of the booklets are turned using a page-turning mechanism (for example, refer to JP 2010-228351 A). Using such a page-turning device, it is possible to efficiently process a booklet when books, contract documents of a corporate, and the like are converted into and stored as electronic data. However, when a large number of booklets are converted into electronic data, one of the booklets is processed, the processed booklet is removed manually, and another booklet is set. This makes it difficult to continuously process a plurality of booklets. Meanwhile, in the related art, there is known a device capable of separating and feeding a plurality of stacked booklets one by one starting from the lowermost one (for example, refer to JP 2010-228351 A).

In the technique discussed in JP 2010-208756 A, a gap size between an overlapping feeding restriction member and a driving rotation body changes depending on a thickness of a feeding target material by vertically moving the overlapping feeding restriction member as an elastic deformation volume of an elastic body changes using a spring deformation adjustment mechanism.

In the technique discussed in JP H8-245001 A, when a thickness of the booklets is equal to or larger than a certain level, a claw is installed in an endless chain, and a set of booklets are fed one by one by forcedly feeding the booklets using the claw. Meanwhile, when the thickness of the booklets is small, the claw is removed from the endless belt, and the booklets are continuously fed on the belt one by one.

CITATION LIST

Patent Literatures

[Patent Literature 1] JP 2010-228351 A
[Patent Literature 2] JP 2010-208756 A
[Patent Literature 3] JP H8-245001 A

SUMMARY OF INVENTION

However, in the techniques discussed in JP 2010-208756 A and JP H8-245001 A, it is necessary to appropriately control the spring deformation adjustment mechanism or the claw depending on the thickness of the booklet. Therefore, it is difficult to feed the booklets having arbitrary thicknesses one by one without a control.

Even when the page-turning device discussed in JP 2010-228351 A and the booklet feeding mechanism discussed in JP 2010-208756 A or JP H8-245001 A are combined, it is difficult to arrange the booklet in an appropriate place of the page-turning device without a manual method.

In view of the aforementioned problems, there is a need for a page-turning reader device and a feeder device capable of continuously acquiring image data of each page of a plurality of booklets.

In addition, there is a need for a page-turning reader device and a feeder device capable of continuously acquiring image data of each page of a plurality of booklets even when a plurality of stacked booklets have different thicknesses.

According to an aspect of the invention, there is provided a page-turning reader device that reads each page of a booklet obtained by binding one-side edges of a plurality of overlapping pages, including: a feeder unit that feeds a plurality of stacked booklets one by one from a lower side; a holder that grips and fixes a binding edge of the booklet fed from the feeder unit; a page-turning means that turns pages of the booklet one by one while the holder fixes the booklet; and an image data acquiring means that acquires image data of each page of the booklet in synchronization with a turning operation of the page-turning means. In this configuration, it is possible to continuously acquire image data of each page of a plurality of stacked booklets.

In the page-turning reader device described above, first and second feeding belt units capable of placing and feeding the booklet may be provided in upstream and downstream sides, respectively, of the holder, and the holder and the first and second feeding belt units may be independently operable. In this configuration, it is possible to prevent two-page turning or perform a highly accurate control for acquiring the high precision image data by changing heights of the holder and the first and second feeding belt units during the turning operation or the image data acquisition.

In the page-turning reader device described above, a transparent flatbed may be provided to face the holder and the first and second feeding belt units, and the image data acquiring means may acquire the image data while the holder and the first and second feeding belt units relatively approaches the flatbed, and the booklet is pressed by the flatbed. In this configuration, even when the booklet is thick, it is possible to acquire clear image data in the center portion between the left and right pages.

In the page-turning reader device described above, the feeder unit may include a feeding tray where the plurality of booklets are stacked, a feeding means that extracts and feeds the booklet from a lower side of the plurality of booklets stacked on the feeding tray, and a separation means that separates the booklets overlappingly extracted from the lower side of the plurality of booklets. In this configuration, even when a plurality of booklets are overlappingly extracted from the lower side of a plurality of booklets stacked on the feeding tray, it is possible to separate them into a single booklet using a separation means and supply the booklets one by one to the page-turning unit.

In the page-turning reader device described above, the separation means may be arranged in two places, and a distance between the separation means may be longer than a length of the booklet. In this configuration, since the separation means are arranged in two places, it is possible to reliably separate the overlappingly fed booklets without applying a strong separation force to the booklet. In addition, since the distance between the separation means is longer than the length of the booklet, the separation means in the rear stage can separate the booklets without an influence from the separation means of the front stage.

In the page-turning reader device described above, the separation means may be a rubber roller having a torque limiter. In this configuration, since the separation means can adjust a brake force using the torque limiter, it is possible to separate the booklets without damaging the booklet.

In the page-turning reader device described above, the feeding means may have a plurality of rubber rollers and a rotation control means that controls rotation of the plurality of rubber rollers using a plurality of electromagnetic clutches. In this configuration, it is possible to supply the booklets to the page-turning unit one by one by controlling rotation of the rubber rollers using the electromagnetic clutches.

The page-turning reader device described above may further include a feeding location detecting means that detects a feeding location of the booklet, and the rotation control means may perform an ON/OFF control for the plurality of electromagnetic clutches based on the feeding location of the booklet detected by the feeding location detecting means. In this configuration, since the rotating roller changes by controlling the ON/OFF state of the electromagnetic clutches based on the feeding location of the booklet, it is possible to feed only a single feeding target booklet.

In the page-turning reader device described above, the feeding means may have a one-way clutch drivenly rotated by an adjoining booklet. In this configuration, it is possible to feed only a single feeding target booklet out of the overlapping booklets.

The page-turning reader device described above may further include an air suction means that sucks the air to attract the fed booklet to the feeding means side. In this configuration, even when the fed booklet is light, it is possible to easily feed the booklet using the feeding means.

The page-turning reader device described above may further include: an abnormality detecting means that detects abnormality in the image data acquired by the image data acquiring means; and an abnormality processing means that discharges, to a unsuccessful booklet stack tray, a booklet having the abnormality when the abnormality detecting means detects the abnormality in the image data. In this configuration, it is possible to avoid interruption of the processing by discharging the booklet having abnormality into an unsuccessful booklet stack tray.

The page-turning reader device described above may further include: a loader/conveyor unit where the plurality of booklets are stacked; a feeder booklet detecting means that detects whether or not a booklet is present in the feeder unit; and a booklet supply control means that operates the loader/conveyor unit to shift the stacked booklets to the feeder unit when the feeder booklet detecting means determines that no booklet is present in the feeder unit. In this configuration, when a large number of booklets are processed, it is possible to automatically perform the processing just by stacking the large number of booklets on the loader/conveyor unit.

According to another aspect of the invention, there is provided a page-turning reader device capable of continuously acquiring image data of each page of booklets having different thicknesses.

The page-turning reader device includes: a holder that holds a binding edge of an inserted booklet and maintains a predetermined gripping pressure applied to the inserted booklet; a page-turning means that turns pages of the booklet one by one while the booklet is arranged in the holder; and an image data acquiring means that acquires image data of each page of the booklet in synchronization with a page-turning operation of the page-turning means. In this configuration, it is possible to reliably hold the booklet and continuously acquire image data while the holding state is maintained without considering a thickness of the booklet to be read.

In the page-turning reader device described above, the holder may have a holding claw that grips the binding edge of the booklet arranged on a plane and is turned to direct the other edge of the booklet to the image data acquiring means side. In this configuration, the other edge of the booklet that is not bound is directed to the image data acquiring means side. For this reason, compared to a case where the booklet is opened just by arranging one edge on a plane, it is possible to stabilize an opening state of both the left and right pages. In addition, since each page is not bent acutely to the front cover page side, it is possible to prevent damage to the booklet.

In the page-turning reader device described above, first and second feeding belt units capable of placing and feeding the booklet may be provided in upstream and downstream sides, respectively, of the holder, and the holder and the first and second feeding belt units may be independently operable. In this configuration, during the page-turning operation or the image data acquisition, by changing heights of the holder and the first and second feeding belt units, it is possible to prevent a two-page turning or perform a highly accurate control for acquiring the high precision image data.

The page-turning reader device described above may further include a transparent flatbed arranged to face the holder and the first and second feeding belt units, and the image data acquiring means may acquire the image data while the holder and the first and second feeding belt units relatively approaches the flatbed, and the booklet is pressed by the flatbed. In this configuration, it is possible to acquire clear image data in the center portion between the left and right pages even when the booklet is thick.

According to still another aspect of the invention, there is provided a feeder device capable of separating and feeding a plurality of stacked booklets one by one. The feeder device includes: a feeding tray where a plurality of booklets are stacked; a feeding path having a feeding means that extracts and feeds the plurality of booklets stacked on the feeding tray from a lower side of the stack; and a retard means that separates overlappingly extracted booklets by pressing a top surface of the overlapping booklets, wherein the retard means are provided in at least two places on the feeding path. In this configuration, even when a plurality of booklets are arranged on the feeding tray in an overlappingly stacked state, it is possible to prevent the booklet from being fed to the next process in an overlappingly stacked state. In addition, it is possible to process the booklets even when each booklet has different thicknesses.

In the feeder device described above, a pressing force for separation may be strengthened stepwise from the retard means provided in the upstream side of the feeding path to the retard means provided in the downstream side. In this configuration, it is possible to reliably separate the booklets in the downstream side. For this reason, even when a plurality of booklets are overlapping fed, it is possible to reliably separate and feed them one by one.

In the feeder device described above, a swelling detection sensor that detects an obstacle having a height equal to or larger than a thickness of the fed booklet may be provided on the feeding path between the plurality of retard means. In this configuration, a page on a top surface of a booklet having a binding edge arranged in the upstream side (reversely inserted booklet) is turned due to a frictional force with the retard means. For this reason, when an orientation of the fed booklet is different, it is possible to detect it using the swelling detection sensor.

According to this invention, the page-turning reader device includes: a feeder unit that feeds a plurality of stacked booklets one by one from a lower side; a holder that grips and fixes a binding edge of the booklet fed from the feeder unit; a page-turning means that turns pages of the booklet one by one while the holder fixes the booklet; and an image data acquiring means that acquires image data of each page of the booklet in synchronization with a turning operation of the page-turning means. Therefore, it is possible to continuously acquire image data of each page of a plurality of stacked booklets.

BRIEF DESCRIPTION OF DRAWINGS

The foregoing and additional features and characteristics of this disclosure will become more apparent from the following detailed description considered with the reference to the accompanying drawings, wherein:

FIG. 42 is a schematic side view illustrating the page-turning unit for describing a technique of detecting a page-turning failure and the like.

DESCRIPTION OF EMBODIMENTS

Figure 1:
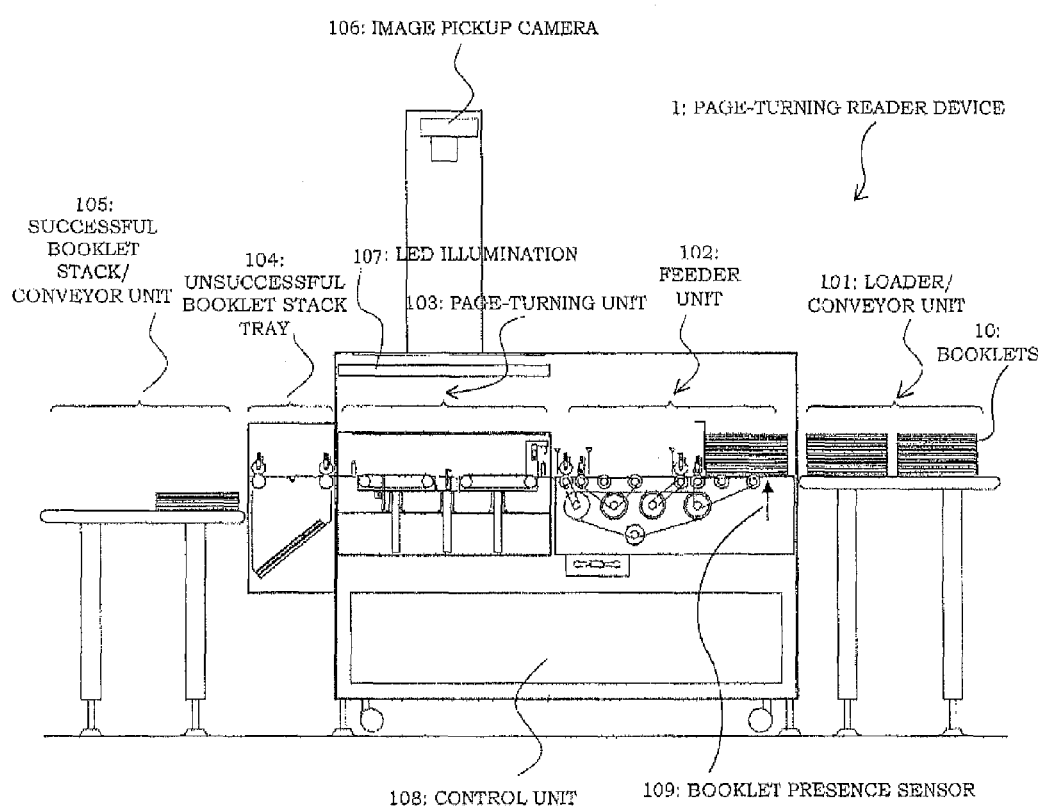
FIG. 1 is a schematic diagram illustrating a whole configuration of a page-turning reader device according to an embodiment of the invention.

Hereinafter, a page-turning reader device according to an embodiment of the invention will be described in detail with reference to the accompanying drawings. FIG. 1 is a schematic diagram illustrating a whole configuration of the page-turning reader device 1. As illustrated in FIG. 1, the page-turning reader device 1 includes a loader/conveyor unit 101, a feeder unit 102, a page-turning unit 103, an unsuccessful booklet stack tray 104, a successful booklet stack/conveyor unit 105, an image pickup camera 106, an LED illumination 107, a control unit 108, and a booklet presence sensor 109.

The loader/conveyor unit 101 is a belt conveyor for stacking a plurality of booklets 10 to be read until they are shifted to the feeder unit 102. Here, the "booklet" refers to any bundle of sheets, including documents such as contract letters, books, magazines, and pamphlets, obtained by binding one-side edges of a plurality of overlapping pages.

A feeder unit 102 feeds a plurality of stacked booklets one by one from the bottom. The page-turning unit 103 turns pages of the booklet 10 fed from the feeder unit 102 one by one.

The image pickup camera 106 is, for example, a digital camera for capturing images of the booklet 10 arranged on the page-turning unit 103. It is noted that a means for acquiring the image data of the booklet 10 may be another type such as an image sensor scanning type, which may take time to capture overall pages of the booklet 10, without limiting to the digital camera.

The LED illumination 107 illuminates the booklet 10 when the image of the booklet 10 is captured. The unsuccessful booklet stack tray 104 is a tray for stacking the booklet 10 where abnormality is detected during acquisition of the image data of the booklet 10. The successful booklet stack/conveyor unit 105 is a belt conveyor for stacking the successfully read booklets.

The booklet presence sensor 109 is a sensor for detecting whether or not a booklet 10 is present in the feeder unit 102. It is noted that any sensor known in the art may be employed as the booklet presence sensor 109 and various other sensors for detecting presence of the booklet 10 described below. For example, a sensor capable of detecting presence of the booklet 10 based on a change of an ultrasonic delay amount, a light decay amount, a resistance of a photo-resistor, or the like may be employed.

Figure 2:
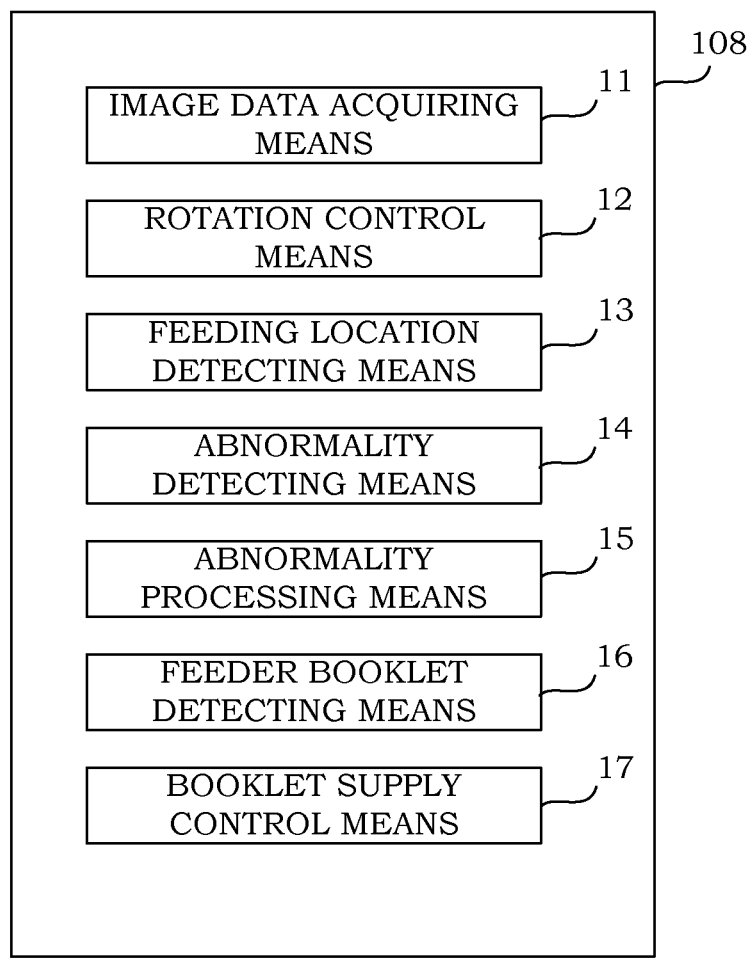
FIG. 2 is a functional block diagram illustrating the page-turning reader device according to an embodiment of the invention.

The control unit 108 includes a central processing unit (CPU) (not illustrated), a memory, and an input/output interface for transmitting and receiving signals to and from the page-turning reader device 1. The CPU serves as a means for controlling operations of each part by executing a processing based on various programs stored in the memory. Although described below in detail, the control unit 108 serves as, as illustrated in FIG. 2, for example, an image data acquiring means 11 that acquires image data of the booklet 10 by controlling the image pickup camera 106, a rotation control means 12 that controls rotation of a roller for feeding the booklet 10 in the feeder unit 102, a feeding location detecting means 13 that detects a feeding location of the booklet 10 in the feeder unit 102, an abnormality detecting means 14 that detects abnormality of the acquired image data, an abnormality processing means 15 that performs a processing when abnormality of the image data is detected, a feeder booklet detecting means 16 that detects whether or not a booklet 10 is present in the feeder unit 102 by receiving a signal from the booklet presence sensor 109, a booklet supply control means 17 that supplies the booklet 10 from the loader/conveyor unit 101 to the feeder unit 102, and the like. In addition, the control unit 108 transmits a control signal to each part to control the operations of each part in response to signals from various sensors provided in each part of the page-turning reader device 1.

Configuration of Page-Turning Unit

Figure 3:
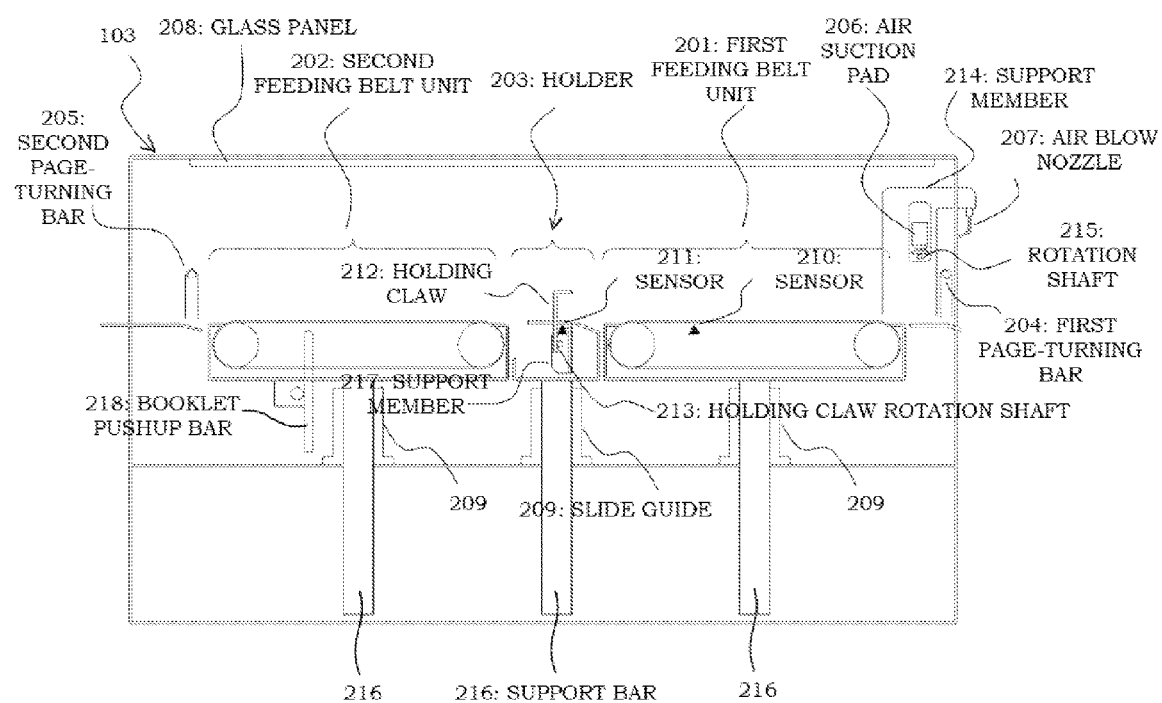
FIG. 3 is a schematic side view illustrating a page-turning unit.

FIG. 3 is a schematic side view illustrating the page-turning unit 103. In the center portion of the page-turning unit 103, a holder 203 is provided to grip and fix a binding portion obtained by binding one-side edges of the booklet 10 fed from the feeder unit 102.

The holder 203 includes a holding claw 212 that holds the booklet 10, a support member 217 that supports the holding claw 212, a holding claw rotation shaft 213 that rotates the holding claw 212, and a sensor 211 that detects whether or not the booklet 10 arrives at the holding claw 212.

The holding claw has a slide mechanism capable of sliding in a thickness direction of the booklet with respect to the support member. The slide mechanism is actuated by an actuator such as a motor (not illustrated). First and second feeding belt units 201 and 202 capable of placing and feeding the booklet 10 are provided in the upstream and downstream sides, respectively, of the holder 203.

A support bar 216 and a slide guide 209 that guides upward and downward movements of the support bar 216 are provided under the first and second feeding belt units 201 and 202 and the holder 203. The first and second feeding belt units 201 and 202 and the holder 203 are driven by an actuator (not illustrated) or the like so as to individually move upward, downward, and so on.

As a page-turning means for turning pages of the booklet 10 one by one while the booklet 10 is fixed in the holder 203, the page-turning unit 103 includes: an air suction pad 206 that sucks a page; an air blow nozzle 207 that blows the air to the page sucked by the air suction pad 206; a support member 214 that supports the air suction pad 206 and the air blow nozzle 207; a rotation shaft 215 that rotates the air suction pad 206; a first page-turning bar 204 that turns the page sucked by the air suction pad 206; and a second page-turning bar 205 that turns the page of the second feeding belt unit 202 side to the first feeding belt unit 201 side.

A flatbed of a transparent glass panel 208 is provided over the page-turning unit 103. This glass panel 208 is to capture images of the booklet 10 with a pressure. It is noted that the flatbed for capturing images of the booklet 10 with a pressure is not limited to the glass panel 208, but may be any transparent flat plate member that is not deformed by a pressure, such as plastic or crystal.

The first feeding belt unit 201 is provided with a sensor 210 for determining whether or not the booklet 10 is present. A booklet pushup bar 218 for pushing up the booklet 10 is provided in the downstream side of the second feeding belt unit 202 (in the left side of the second feeding belt unit 202 in FIG. 3). This booklet pushup bar 218 is to recover the booklet 10 to its original state when abnormality occurs in acquisition of the image data of the booklet 10.

Operation of Page-Turning Unit

Next, a description will be made for an operation of acquiring image data of each page by turning pages of the booklet 10 using the page-turning unit 103 with reference to the flowchart of FIG. 4 and the schematic side views of FIGS. 5 to 17 illustrating the page-turning unit 103. Here, the operation will be described for a case where the image data are acquired also for the front and back cover pages of the booklet 10.

First, an operator overlappingly stacks a plurality of booklets 10 on the feeding tray of the feeder unit 102 by directing the binding portions of the booklets to the downstream side (page-turning unit 103 side) and performs a drive start manipulation. As a result, the control unit 108 outputs a start signal to each part of the page-turning reader device 1 to initiate the operation of each part. The control unit 108 outputs various control signals to each part in response to receipt of a signal from each sensor so as to perform the operation of each part.

Figure 4:
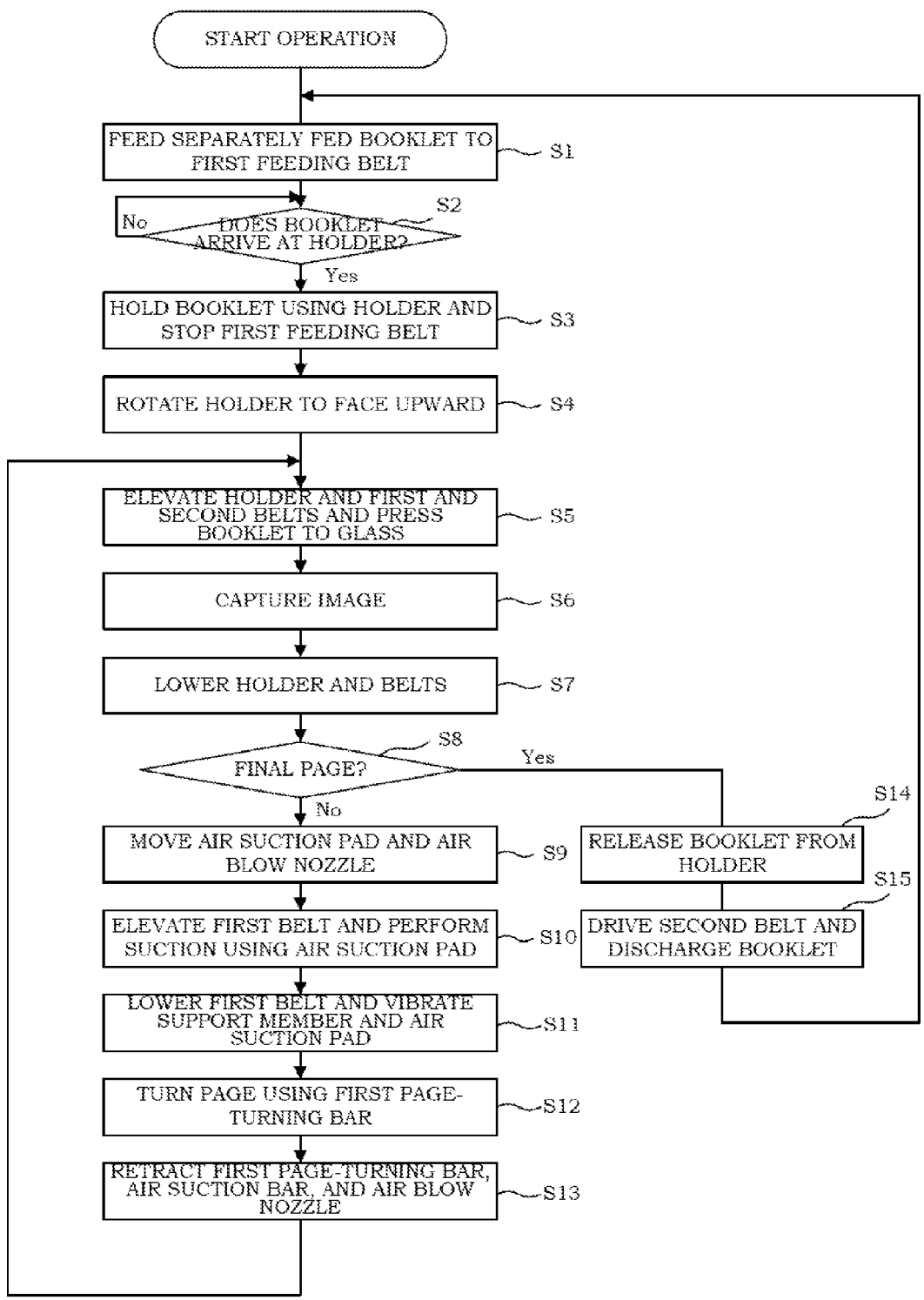
FIG. 4 is a flowchart illustrating a flow of turning pages of a booklet using the page-turning unit and acquiring image data of each page.
Figure 5:
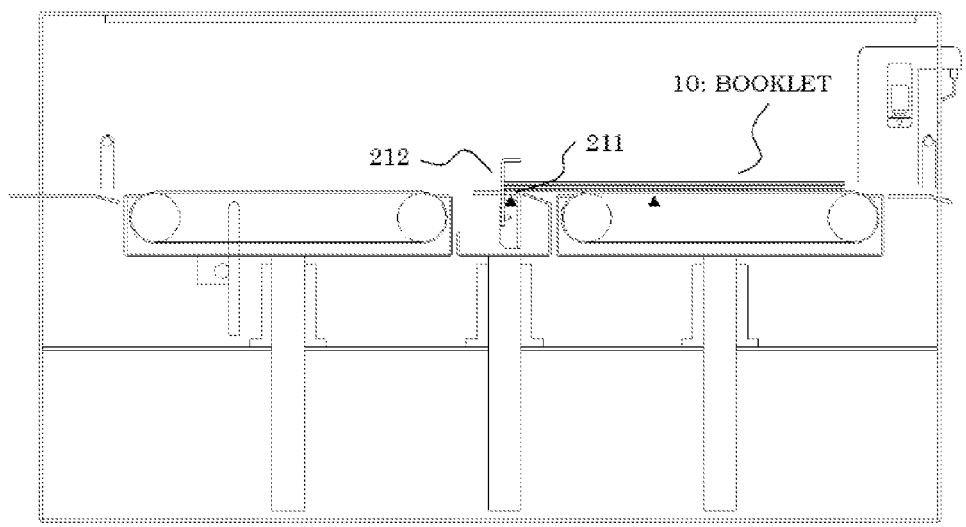
FIG. 5 is a schematic side view illustrating the page-turning unit for describing an operation of the page-turning unit.
Figure 6:
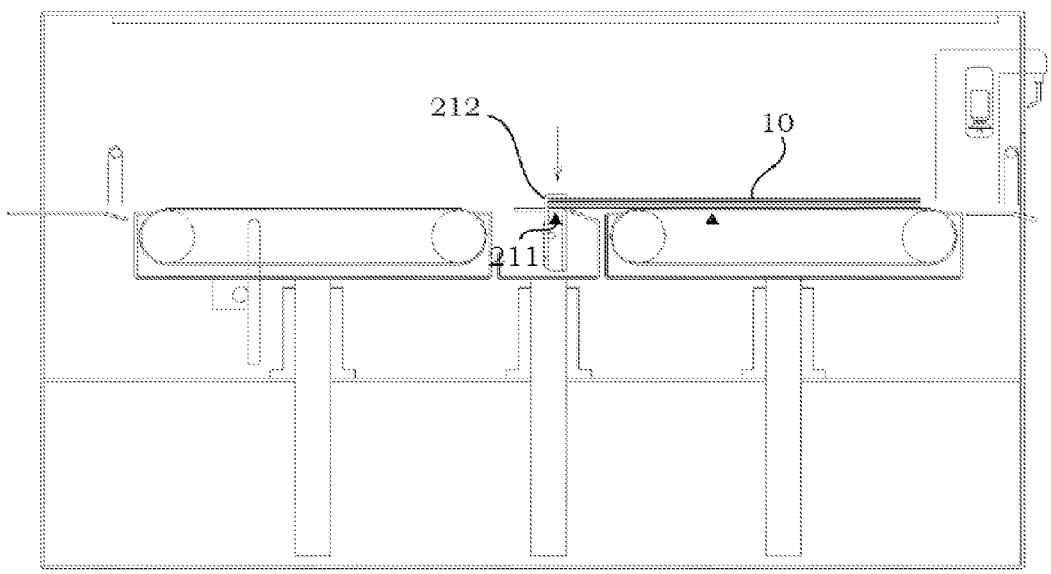
FIG. 6 is a schematic side view illustrating the page-turning unit for describing the operation of the page-turning unit.
Figure 7:
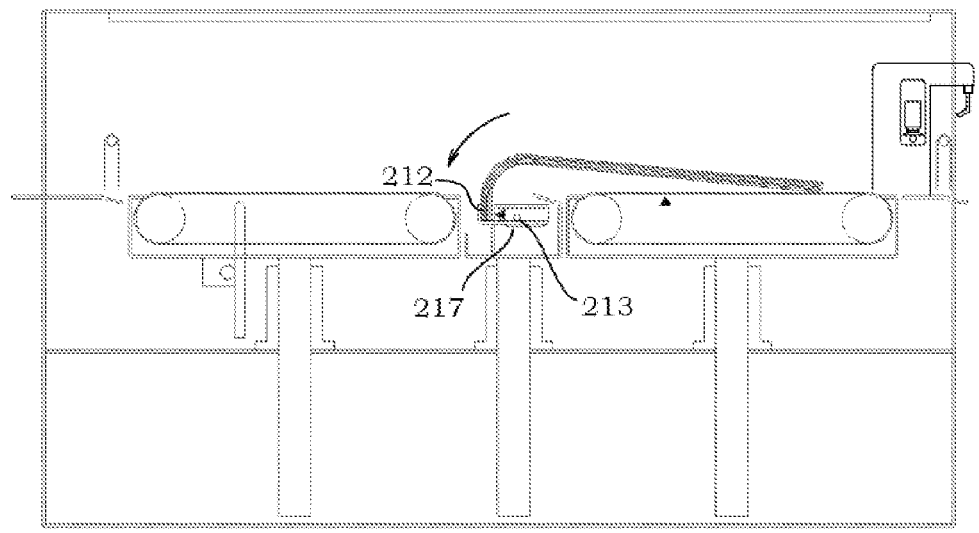
FIG. 7 is a schematic side view illustrating the page-turning unit for describing the operation of the page-turning unit.
Figure 8:
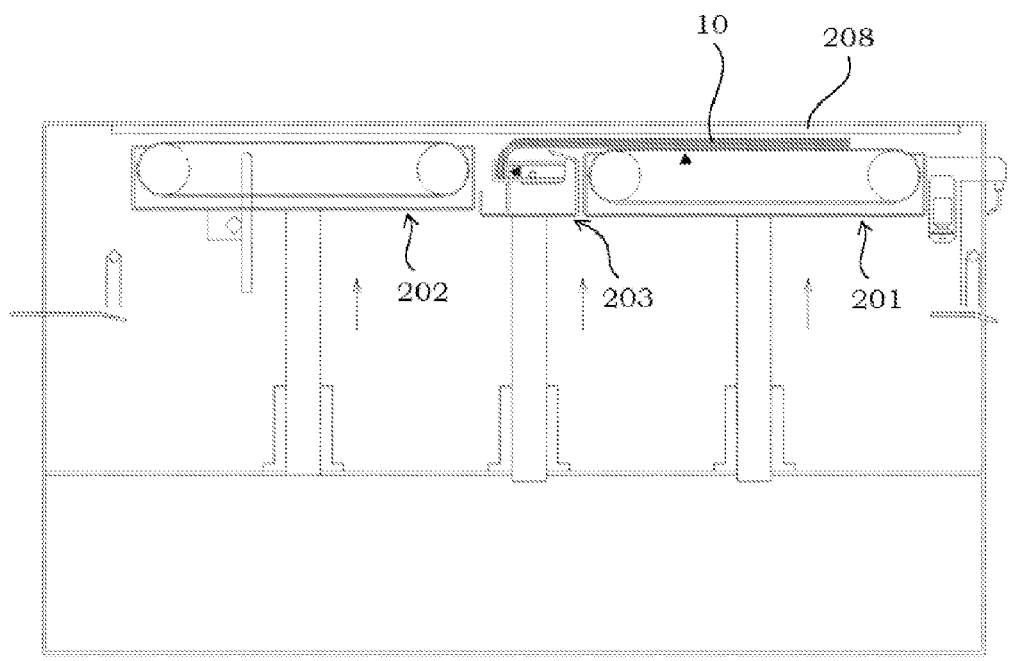
FIG. 8 is a schematic side view illustrating the page-turning unit for describing the operation of the page-turning unit.
Figure 9:
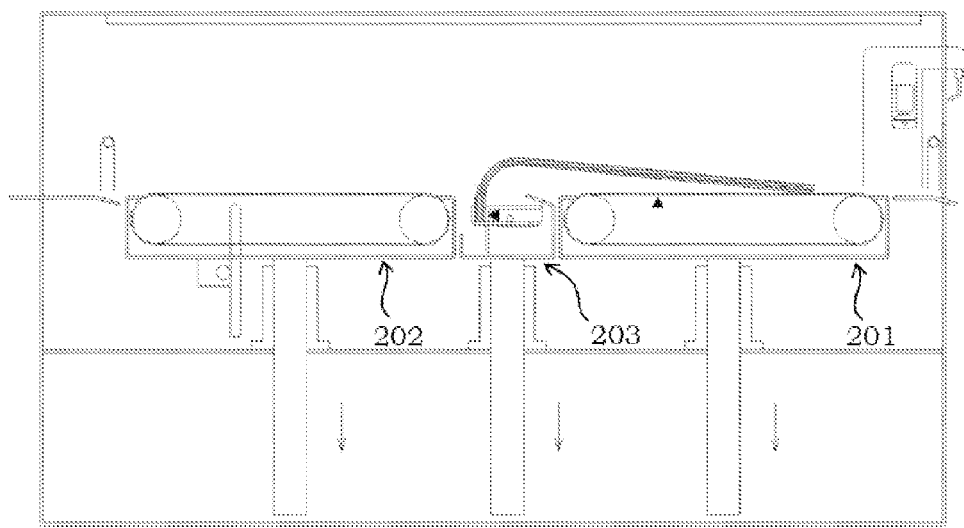
FIG. 9 is a schematic side view illustrating the page-turning unit for describing the operation of the page-turning unit.
Figure 10:
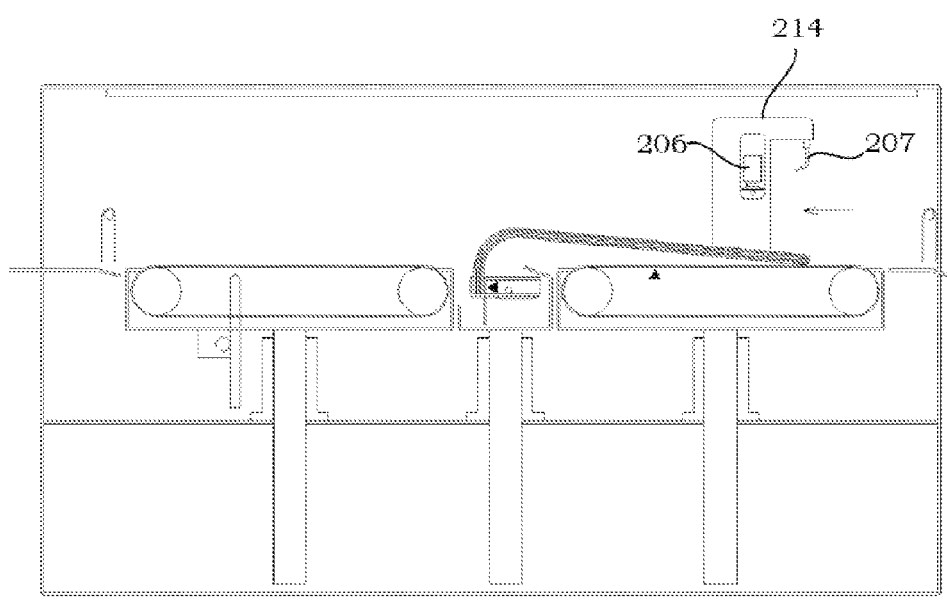
FIG. 10 is a schematic side view illustrating the page-turning unit for describing the operation of the page-turning unit.
Figure 11:
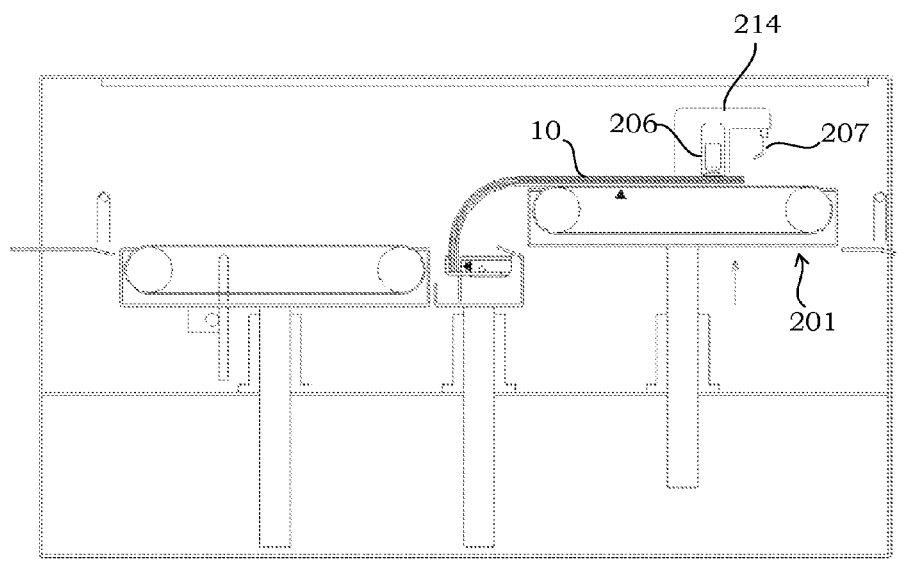
FIG. 11 is a schematic side view illustrating the page-turning unit for describing the operation of the page-turning unit.
Figure 12:
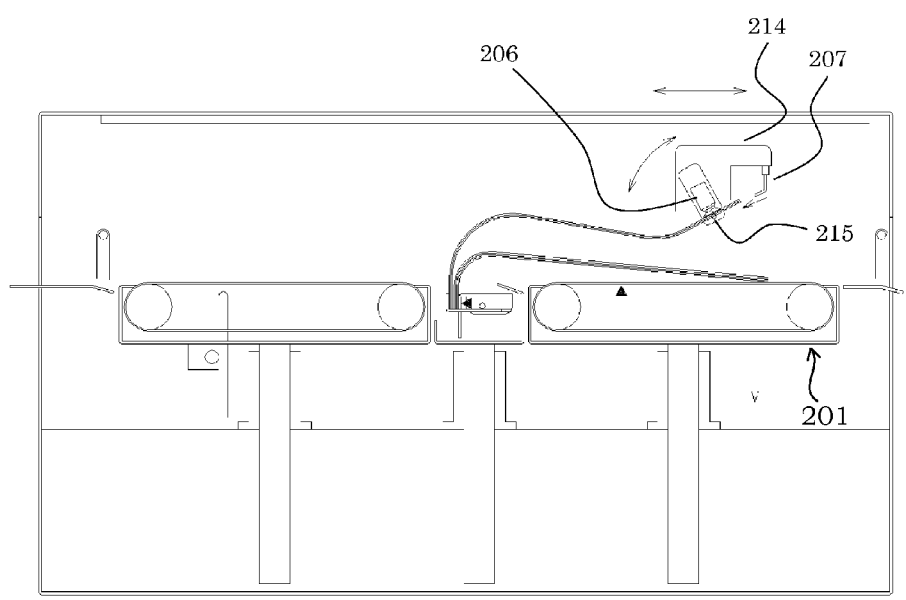
FIG. 12 is a schematic side view illustrating the page-turning unit for describing the operation of the page-turning unit.
Figure 13:
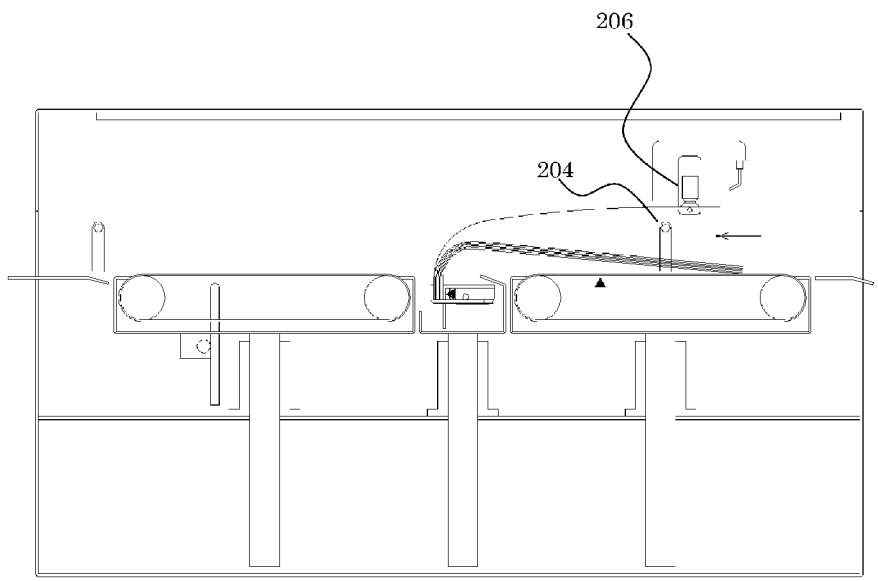
FIG. 13 is a schematic side view illustrating the page-turning unit for describing the operation of the page-turning unit.
Figure 14:
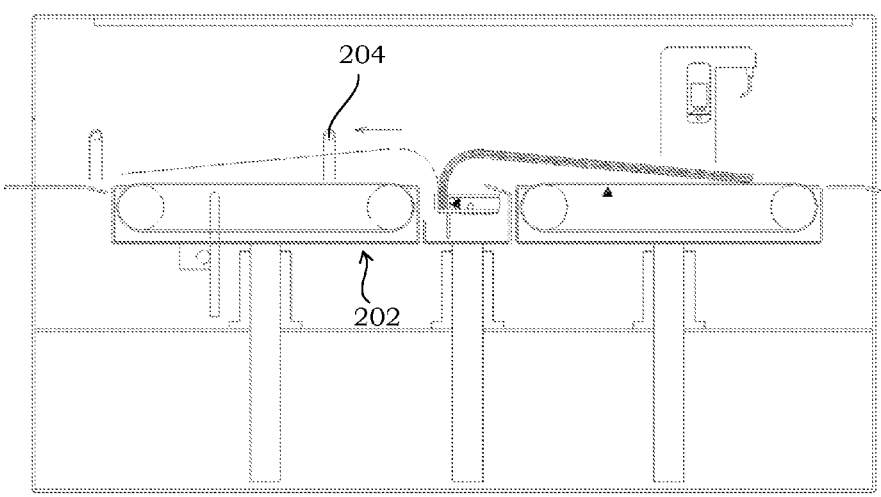
FIG. 14 is a schematic side view illustrating the page-turning unit for describing the operation of the page-turning unit.
Figure 15:
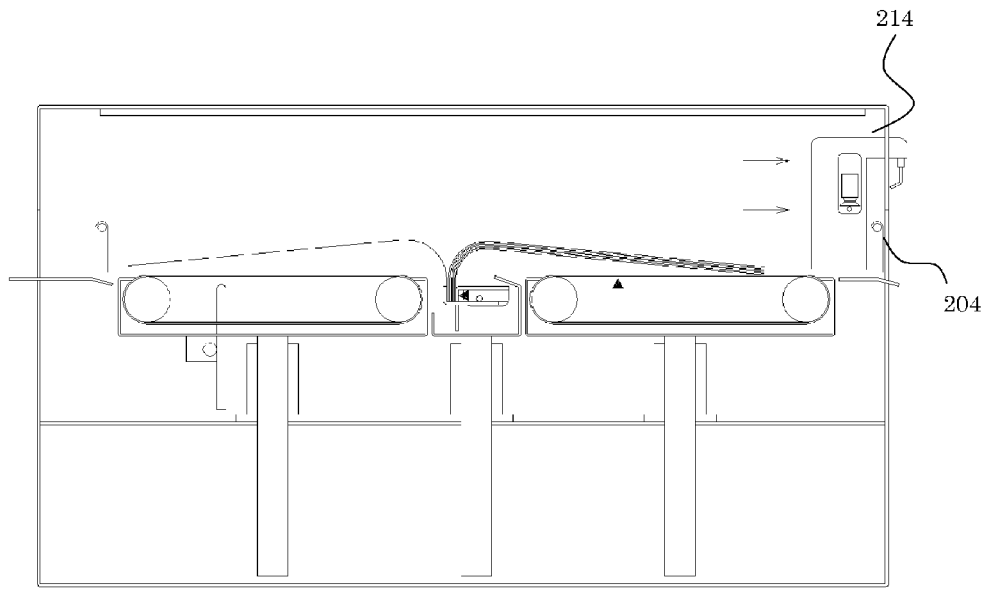
FIG. 15 is a schematic side view illustrating the page-turning unit for describing the operation of the page-turning unit.

First, the feeder unit 102 is operated to feed a single booklet 10 from the feeder unit 102 to the page-turning unit 103 (step S1 in FIG. 4). The booklet 10 is fed to the first feeding belt unit 201 of the page-turning unit 103 and arrives at a location of the holding claw 212 of the holder 203 (refer to FIG. 5). As a result, the sensor 211 is turned on.

As the sensor 211 is turned on, the control unit 108 detects that the booklet 10 arrives at the holder 203 (step S2). In addition, the control unit 108 shifts the holding claw 212 downward and stops the first feeding belt unit 201 (step S3). As a result, the binding portion of the booklet 10 is gripped and fixed by the holding claw 212. The gripping of the booklet using the holding claw may be controlled using a sensor such as a pressure sensor. In this embodiment, the gripping of the booklet is controlled by performing a pulse width modulation (PWM) control for a driving motor. If the PWM control is performed, a driving voltage of the motor is continuously applied while an ON/OFF operation thereof is instantaneously controlled. For this reason, it is possible to reduce a gap stepwise until the booklet is gripped. After the booklet is gripped, it is possible to maintain a suitable gripping pressure of the booklet. In addition, since the motor does not continuously apply the driving voltage, it is possible to avoid a so-called overload state and reduce a burden of the motor. Furthermore, the control according to an embodiment of the invention can be implemented just by selecting a motor capable of generating a proper torque and setting the applied pulse width. Therefore, the control can be implemented simply and easily with a low cost, compared to the sensor control (refer to FIG. 6).

Then, the support member 217 of the holding claw 212 is rotated by 90° with respect to the holding claw rotation shaft 213 to direct the vicinity of the binding portion of the booklet 10 to a vertical direction. That is, if the booklet is erected vertically, the other end that is not bound is arranged in the image data acquiring means 11 side (step S4, refer to FIG. 7). Then, the holder 203 is elevated using the first and second feeding belt units 201 and 202 to press the booklet 10 to the glass panel 208 (step S5, refer to FIG. 8).

At this timing, the image data acquiring means 11 controls the image pickup camera 106 to capture an image of the front cover page of the booklet 10 using the image pickup camera 106 to acquire the image data of the front cover page (step S6). Then, the first and second feeding belt units 201 and 202 and the holder 203 are lowered (step S7, refer to FIG. 9).

The control unit 108 determines whether or not the currently captured page is a final page based on the signal from the sensor 210. If it is determined that the current page is not the final page (NO in step S8), the support member 214 for the air suction pad 206 and the air blow nozzle 207 is shifted to the page suction position of the booklet 10 (step S9, refer to FIG. 10).

Then, the first feeding belt unit 201 is elevated to the position of the air suction pad 206. In addition, the air suction pad 206 is turned on to cause the air suction pad 206 to suck the booklet 10 (step S10, refer to FIG. 11).

Then, the first feeding belt unit 201 is moved downward. In addition, the support member 214 is vibrated several times back and forth (to the upstream side and the downstream side) to facilitate separation of a plurality of pages sucked by the air suction pad 206. In addition, only a single sheet is separated out of a plurality of sheets sucked by the air suction pad 206 by swinging the rotation shaft 215 of the air suction pad 206 several times and blowing the air from the air blow nozzle 207 (step S11, refer to FIG. 12). Preferably, the air blow nozzle 207 has a diameter as small as possible and is located in the vicinity of the booklet 10 as close as possible in order to more improve a page separation capability.

Then, the first page-turning bar 204 is shifted to the lower side of the air suction pad 206 (refer to FIG. 13), and the air suction pad 206 is turned off to stop the page suction. The first page-turning bar 204 is further shifted to the second feeding belt unit 202 side to turn the page (step S12, refer to FIG. 14).

Then, the first page-turning bar 204, the air suction pad 206, and the support member 214 of the air blow nozzle 207 are retracted to the positions previous to the shifting (step S13). Then, the first and second feeding belt units 201 and 202 and the holder 203 are elevated to press the booklet 10 to the pressing glass panel 208 (step S5, refer to FIG. 8). At this timing, the image data acquiring means 11 controls the image pickup camera 106 to capture an image of the booklet 10 using the image pickup camera 106 to acquire the image data of the left and right pages (step S6).

The first and second feeding belt units 201 and 202 and the holder 203 are lowered (step S7). Then, the processing of steps S9 to S13 and S5 to S8 are repeated until the final page (YES in step S8).

Figure 16:
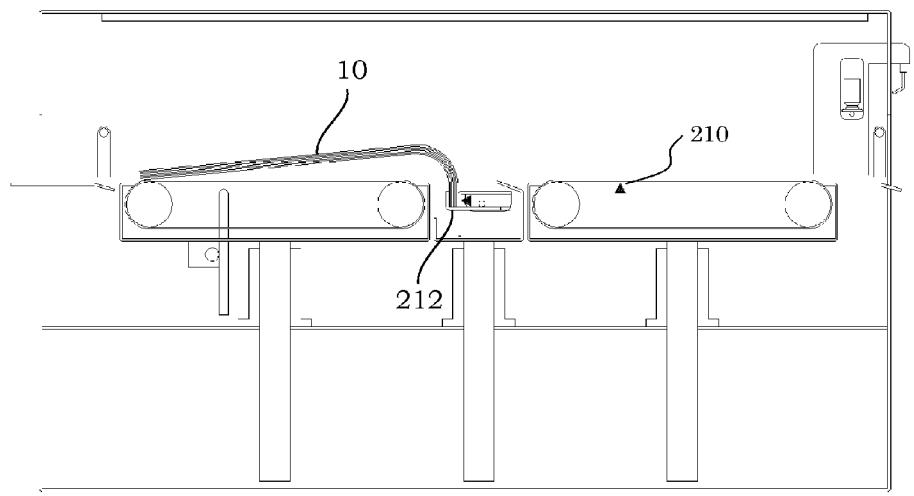
FIG. 16 is a schematic side view illustrating the page-turning unit for describing the operation of the page-turning unit.
Figure 17:
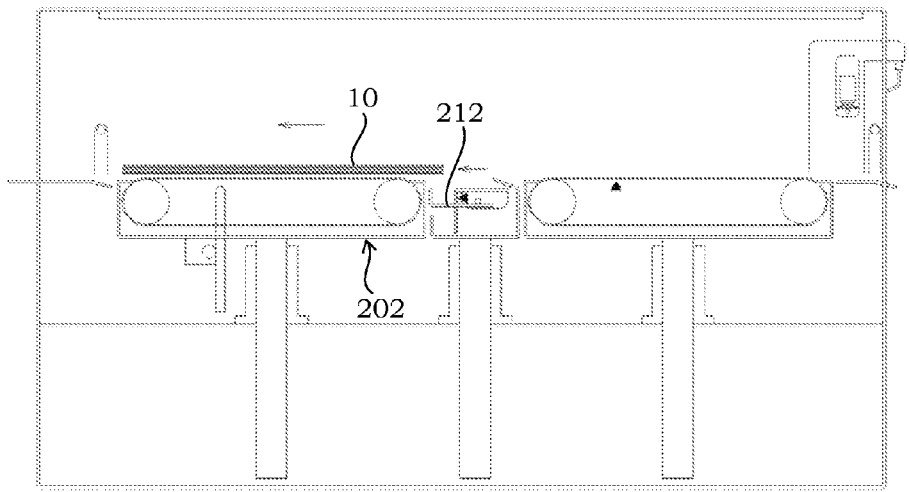
FIG. 17 is a schematic side view illustrating the page-turning unit for describing the operation of the page-turning unit.

In step S8, when the booklet 10 is not detected by the sensor 210 as illustrated in FIG. 16, it is considered that the image capturing is terminated to the final page. Therefore, it is determined YES in step S8.

Then, the booklet 10 is separated from the holding claw 212 by releasing the holding claw 212 (step S14). Then, the booklet 10 is discharged to the downstream side by driving the second feeding belt unit 202 (step S15, refer to FIG. 17). This booklet 10 is discharged to the successful booklet stack/conveyor unit 105 passing through the unsuccessful booklet stack tray 104.

Then, returning to step S1, the processing of the booklet 10 fed from the feeder unit 102 is repeated. In this manner, it is possible to continuously acquire the image data of each page of the booklet 10 sequentially fed from the feeder unit 102, which is efficient.

Since the image data are acquire while the booklet 10 is pressed by the glass panel 208 by elevating the holder 203 and the first and second feeding belt units 201 and 202, it is possible to clearly acquire the image data in the center portion between the left and right pages even when the booklet 10 is thick.

It is noted that, although the description has been made for a case where the image data of the front cover page of the booklet 10 is acquired in the aforementioned embodiment, when the image data of the front cover page is not acquired the processing of step S9 may be performed after step S4 by skipping the processing of steps S5 to S8 as a first processing.

In addition, although the description has been made for a case where the first and second feeding belt units 201 and 202 and the holder 203 are elevated in order to press the booklet 10 to the pressing glass panel 208 when the image data is acquired in the aforementioned embodiment, the invention is not limited thereto. Instead, the glass panel 208 may be lowered.

Processing when Image Reading Abnormality Occurs

Next, a description will be made for a processing performed when the abnormality detecting means 14 of the control unit 108 detects abnormality from the image data acquired by the image data acquiring means 11 with reference to the schematic side views illustrating the page-turning unit 103 in FIGS. 18 to 22.

The abnormality detecting means 14 (refer to FIG. 2) analyzes the acquired image data to determine, for example, whether or not a page is inclined, whether or not a part or a corner of a page is folded, or whether or not an image of the entire page is not captured. In addition, it is determined that there is abnormality if a factor such as an inclination or a ratio of the missing area against the entire page exceeds a predetermined threshold value.

If the abnormality detecting means 14 detects abnormality from the image data, the abnormality processing means 15 (refer to FIG. 2) performs a control of the following process in order to discharge the booklet 10 used to acquire the abnormal image data to the unsuccessful booklet stack tray 104 (refer to FIG. 1).

Figure 18:
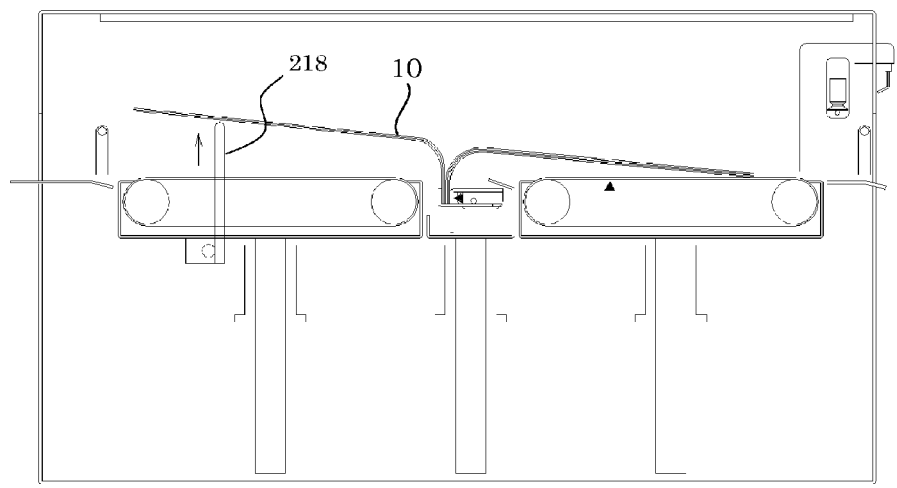
FIG. 18 is a schematic side view illustrating the page-turning unit for describing an operation performed when abnormality is detected from the acquired image data.
Figure 19:
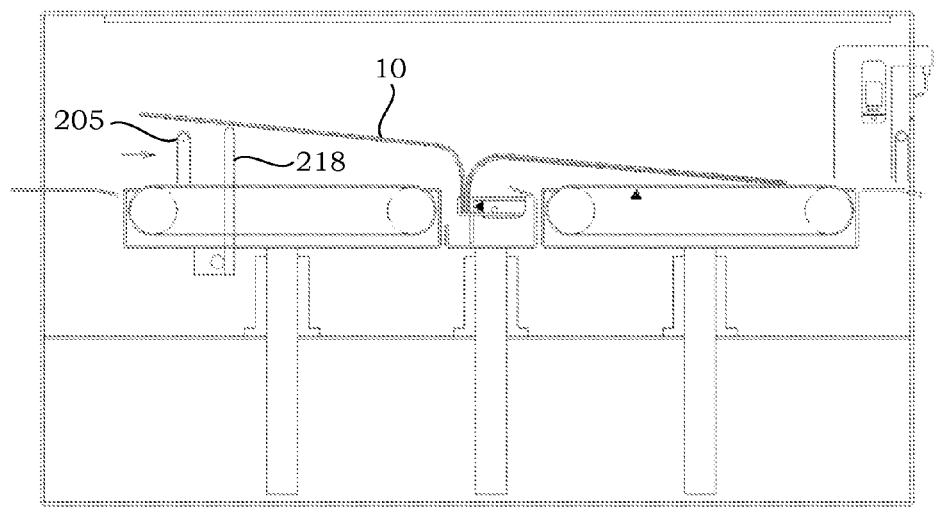
FIG. 19 is a schematic side view illustrating the page-turning unit for describing an operation performed when abnormality is detected from the acquired image data.

First, as illustrated in FIG. 18, the booklet pushup bar 218 is shifted upward to elevate the booklet 10. Then, as illustrated in FIG. 19, the second page-turning bar 205 is shifted to the lower side of the booklet 10.

Figure 20:
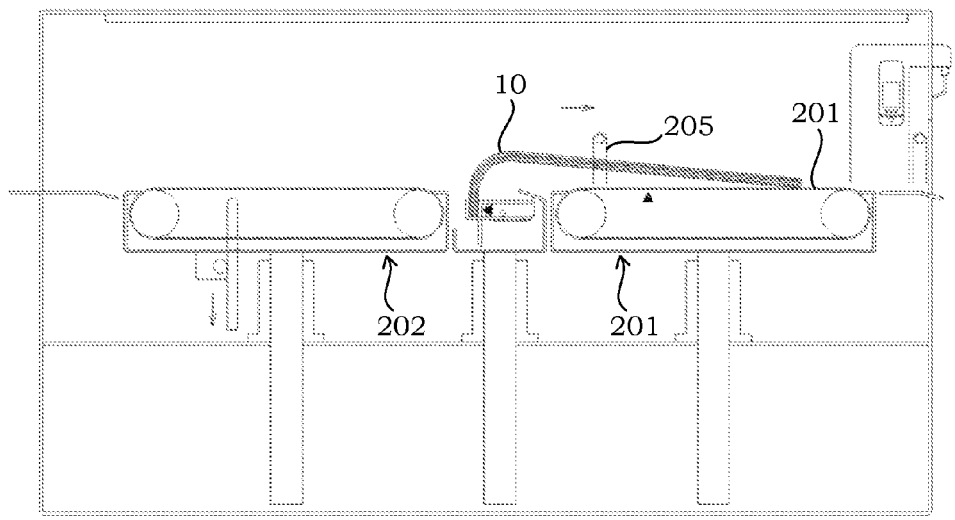
FIG. 20 is a schematic side view illustrating the page-turning unit for describing an operation performed when abnormality is detected from the acquired image data.
Figure 21:
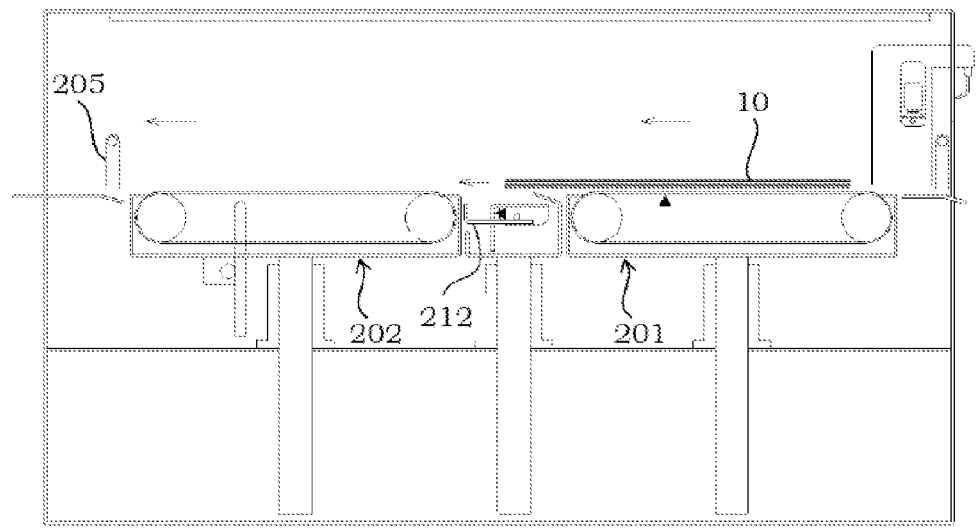
FIG. 21 is a schematic side view illustrating the page-turning unit for describing an operation performed when abnormality is detected from the acquired image data.

Then, as illustrated in FIG. 20, the second page-turning bar 205 is shifted to the first feeding belt unit 201 side to recover the booklet 10 to the original state previous to the page-turning. Then, as illustrated in FIG. 21, the holding claw 212 is released, and the booklet 10 is separated from the holding claw 212. Then, the booklet 10 is shifted from the page-turning unit 103 to the unsuccessful booklet stack tray 104 side by driving the first and second feeding belt units 201 and 202. The second page-turning bar 205 is shifted to the original position.

Figure 22:
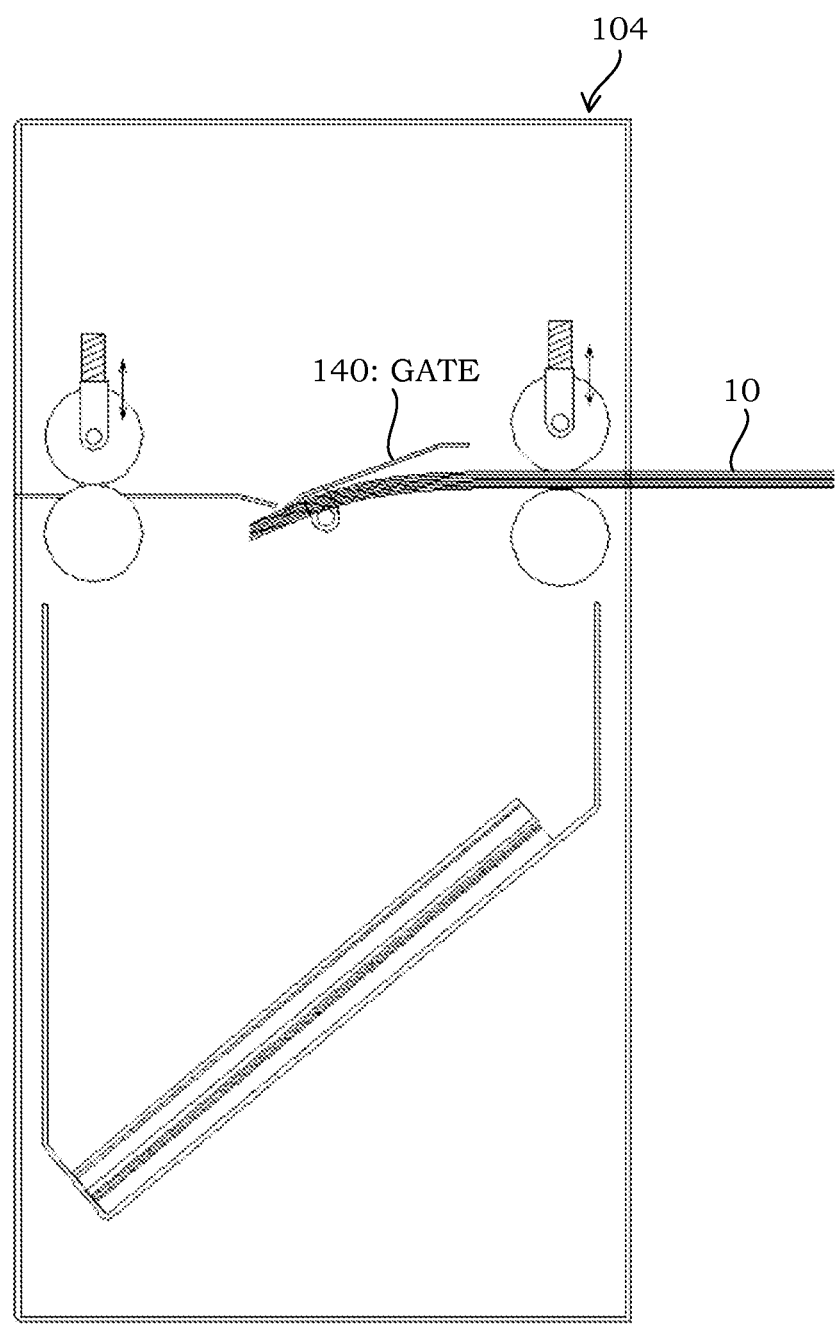
FIG. 22 is a schematic side view illustrating an unsuccessful booklet stack tray for describing an operation performed when abnormality is detected from the acquired image data.

In addition, as illustrated in FIG. 22, the booklet 10 is dropped to the lower side of a gate 140 by opening the gate 140 provided in the vicinity of the center of the inside of the unsuccessful booklet stack tray 104. Then, the processing is performed for another booklet 10 fed from the feeder unit 102 starting from step S1 of FIG. 4 so that the processing is not interrupted.

It is noted that, as a countermeasure performed when abnormality is detected, notification information or an abnormality analysis result may be output, the processing may be interrupted, or the image data of the page where the abnormality is detected may be acquired again (rewritten), instead of the shifting of the booklet 10 to the unsuccessful booklet stack tray 104 side described above. In addition, without limiting to abnormality of the image data, abnormality may include a case where two or more pages are turned by the page-turning unit 103, a case where a jam occurs, and the like.

The abnormality detecting means 14 and the abnormality processing means 15 may be provided in an information processing device such as a personal computer electrically connected to the page-turning reader device 1 instead of the control unit 108 of the page-turning reader device 1.

As a processing for the acquired image data, identification (ID) recognition, radio frequency ID (RFID) recognition, bar code recognition, OCR recognition, and the like may be performed. In addition, the image data may be classified based on the recognized information.

Modification of Glass Panel

It is noted that, although an image of the binding portion in the center portion between the left and right pages can be clearly captured by pressing the booklet 10 to the glass panel 208 in the aforementioned embodiment, a member that presses both ends (edges) of the binding portion in the center portion between the left and right pages of the booklet 10 may also be employed.

Figure 23:
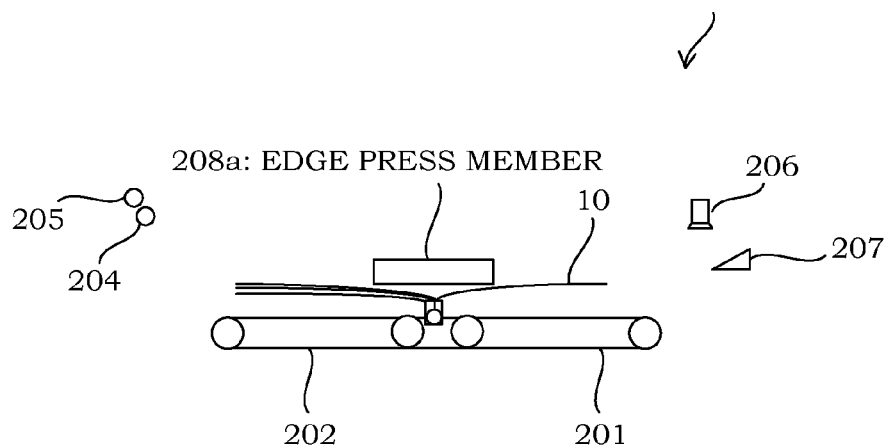
FIG. 23 is a schematic side view illustrating a page-turning unit when a booklet is pressed using an edge press member according to a modification.
Figure 24:
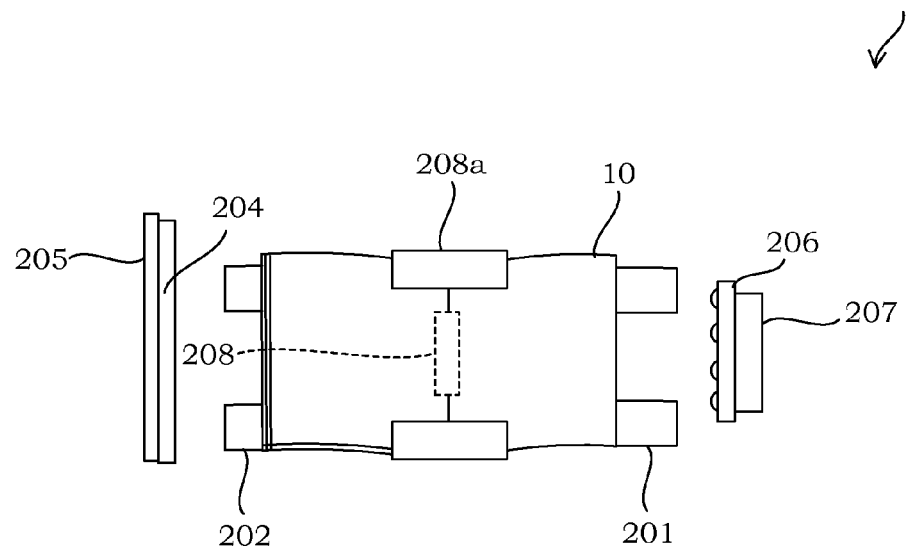
FIG. 24 is a schematic plan view illustrating a page-turning unit when a booklet is pressed using an edge press member according to a modification.

FIG. 23 is a schematic side view illustrating the page-turning unit 103A while the booklet 10 is pressed by the edge press member 208a, and FIG. 24 is a schematic front view illustrating the page-turning unit 103A. When this edge press member 208a is used, the booklet 10 is not pressed to the glass panel 208 in step S5 of FIG. 4, but a pair of edge press members 208a are controlled by an actuator and the like to move to the binding portion of the booklet 10 and press both ends of the binding portion by a pair of edge press members 208a.

Configuration of Feeder Unit

Figure 25:
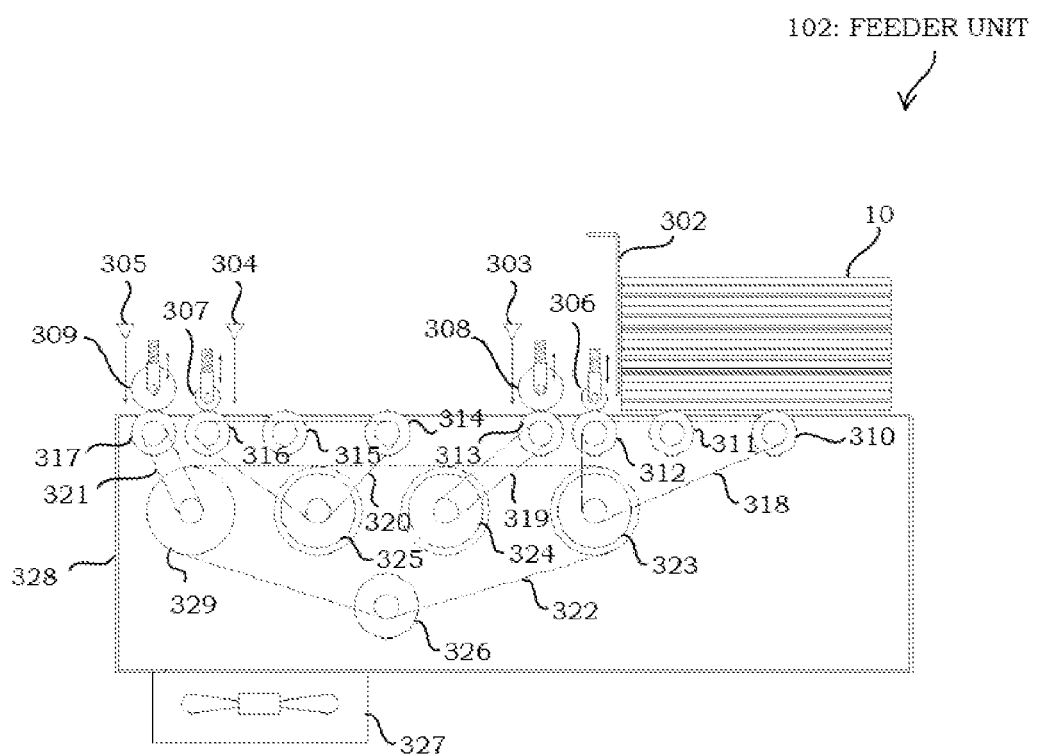
FIG. 25 is a schematic side view illustrating a feeder unit.

Next, a configuration of the feeder unit 102 will be described. FIG. 25 is a schematic side view illustrating the feeder unit 102.

As illustrated in FIG. 25, the feeder unit 102 includes a housing 328 having an internal space in a cubic shape and a feeding tray 302 arranged on a top surface of the housing 328. The feeding tray 302 is provided to overlappingly stack a plurality of booklets 10.

In the upper side of the housing 328, rubber rollers 310, 311, 312, 313, 314, 315, 316, and 317 are provided in this order from the upstream side. The rubber rollers 310, 311, 312, 313, 314, 315, 316, and 317 are partially exposed on the top surface of the housing 328 and serve as a feeding means that sequentially extracts a plurality of booklets 10 stacked on the feeding tray 302 from the lower side and feeds them to the page-turning unit 103 of the downstream side.

The housing 328 is provided with a clutch roller 323 that transmits a rotational force to the rubber rollers 310, 311, and 312 through a belt 318, a clutch roller 324 that transmits a rotational force to the rubber roller 313 through a belt 319, and a clutch roller 325 that transmits a rotational force to the rubber rollers 314, 315, and 316 through a belt 320. The clutch rollers 323, 324, and 325 have an electromagnetic clutch and are capable of controlling transmission and separation (stop of rotation) of the rotational force from the motor 326 to the rubber rollers 310 to 316 based on an ON/OFF control of the electromagnetic clutch.

Over the rubber roller 312, a first retard means 306 is provided to separate a plurality of booklets 10 when a plurality of booklets 10 are overlappingly extracted from the feeding tray 302. Over the rubber roller 313, a pressing roller 308 is provided to press the booklet 10 downward.

In the downstream side of the rubber roller 313 (left side of the rubber roller 313 in FIG. 25), a sensor 303 is provided to detect whether or not a booklet 10 is present in that position. In addition, over the rubber roller 316, a second retard means 307 is provided to separate a plurality of booklets 10 that are not separated through the first retard means 306 and are overlappingly fed. The first and second retard means 306 and 307 are arranged to have a distance therebetween longer than the length of the booklet 10. If such an arrangement distance is provided, it is possible to prevent a tight tension that may be caused by applying frictional forces to the same booklet from a plurality of places along a feeding direction.

Over the rubber roller 317, a pressing roller 309 is provided. It is noted that the pressing rollers 308 and 309 have a driving force transmitting means (not illustrated) according to this embodiment. For this reason, a rotational force following the feeding direction of the booklet 10 is applied to the pressing rollers 308 and 309. The first retard means 306, the second retard means 307, the pressing roller 308, the rubber roller 314, the pressing roller 309, and the rubber roller 317 constitute a separation means that separates a plurality of overlapping booklets 10. Here, although the first and second retard means 306 and 307 arranged along the feeding path of the booklet 10 serve as retard means in this embodiment, the retard means may be additionally arranged to perform separation more accurately. In this case, a stronger pressing force may be applied to the booklet 10 from the retard means arranged in the upstream side to the retard means arranged in the downstream side.

In the upstream side (right side of the rubber roller 316 in FIG. 25) of the rubber roller 316, a sensor 304 is provided to detect whether or not a booklet 10 is present in that position. In the downstream side of the rubber roller 317 (left side of the rubber roller 317 in FIG. 25), a sensor 305 is provided to detect whether or not a booklet 10 is present in that position.

In the lower end of the housing 328, a suction fan 327 is provided to suck the air in the vicinity of the rubber rollers 314 and 315 from gaps between the housing 328 and the rubber rollers 314 and 315 to attract the booklet 10 in the vicinity of the rubber rollers 314 and 315 to the rubber rollers 314 and 315 to facilitate the feeding.

Inside the housing 328, a driving motor 326 is provided to apply a rotational force to the clutch rollers 323, 324, and 325 and the roller 329. In addition, in the downstream end of the feeder unit 102, a continuous rotation type rubber roller 317 is provided to receive a rotational force of the driving motor 326 using a roller 329 that does not have an electromagnetic clutch. It is noted that the rotational force from the driving motor is transmitted to the clutch rollers 323, 324, and 325 and the roller 329 through the belt 322, and the rotational force of the roller 329 is transmitted to the rubber roller 317 through the belt 321.

Figure 26:
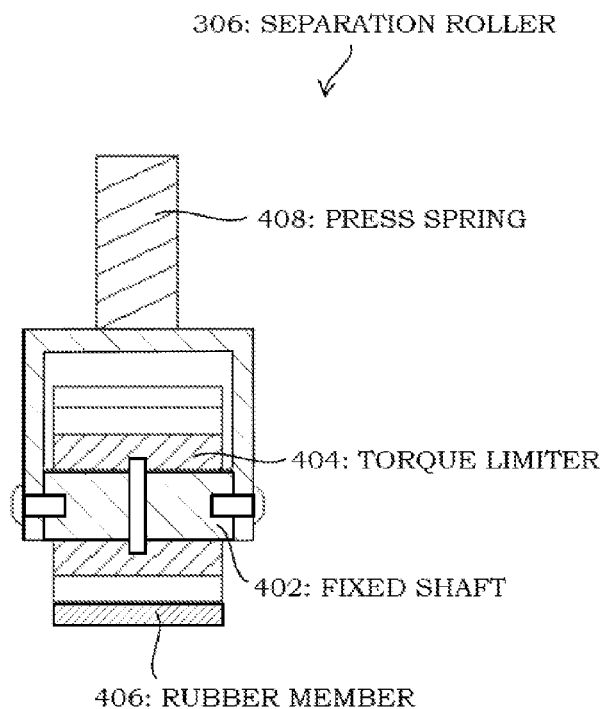
FIG. 26 is a schematic horizontal cross-sectional view illustrating a separation roller.

FIG. 26 is a schematic horizontal cross-sectional view illustrating the first and second retard means 306 and 307 (note that FIG. 26 illustrates the first retard means 306). As illustrated in FIG. 26, the first retard means 306 (second retard means 307) includes a fixed shaft 402 serving as a rotation shaft, a torque limiter 404 provided in an outer circumference of the fixed shaft 402 to adjust a brake force, a rubber member 406 provided in an outer circumference of the torque limiter 404 to separate the overlapping booklets 10, and a press spring 408 that presses the fixed shaft 402 downward. That is, the first and second retard means 306 and 307 are rubber rollers internally having torque limiters.

It is noted that the first retard means 306 serves as a fixed roller by restricting its rotation in this embodiment. For this reason, the first retard means 306 may have any other shape such as a squeegee-like shape or a simple bar-like shape if it can generate an appropriate brake force on the surface of the booklet without any particular limitation.

A pressing force of the press spring 408 of the first retard means 306 is set to be significantly weaker than that of the second retard means 307. For this reason, even when the first retard means 306 makes contact with the underlying rubber roller 312 with no booklet 10 being present, an excessive force is not likely applied to the rubber roller 312. In addition, even when a single booklet is present between the rubber roller 312 and the first retard means 306, an excessive frictional force that may damage the booklet 10 is not likely applied to the surface of the booklet 10.

However, when a plurality of booklets are present between the rubber roller 312 and the first retard means 306, a frictional force between the rubber roller 312 and the booklet 10 or a frictional force between the first retard means 306 and the booklet 10 is stronger than the frictional force between the overlapping booklets 10. For this reason, the underlying booklet 10 fed and gripped by the rubber roller 312 is separated from the overlying booklet 10 that receives a brake force from the first retard means 306 (coarse separation).

A pressing force of the press spring 408 of the second retard means 307 is set to be stronger than that of the first retard means 306. For this reason, a torque limiter 404 is provided to prevent an overload on the rubber roller 316 even when the booklet is not present between the rubber rollers 316. As a result, the second retard means 307 is drivenly rotated by the rubber roller 316 while the torque limiter 404 applies a brake effect in a state where the second retard means 307 makes contact with the rubber roller 316.

As described above, the first retard means 306 is to coarsely separate the overlapping booklets 10. For this reason, the number of the booklets 10 fed to the second retard means 307 may be either singular or plural, or two or more magazines may be overlappingly fed. When a single booklet 10 is present between the rubber roller 316 and the second retard means 307, the second retard means 307 is drivenly rotated in synchronization with the movement of the booklet 10. Meanwhile, when there are a plurality of overlapping booklets 10, the lower booklet 10 moves while it is gripped by the rubber roller 312. However, the brake force of the torque limiter 404 is stronger than the frictional force of the overlapping booklets 10. Therefore, the second retard means 307 is not rotated, and the upper booklet 10 is gripped by the second retard means 307 and is separated by the brake force of the torque limiter 404.

Figure 27:
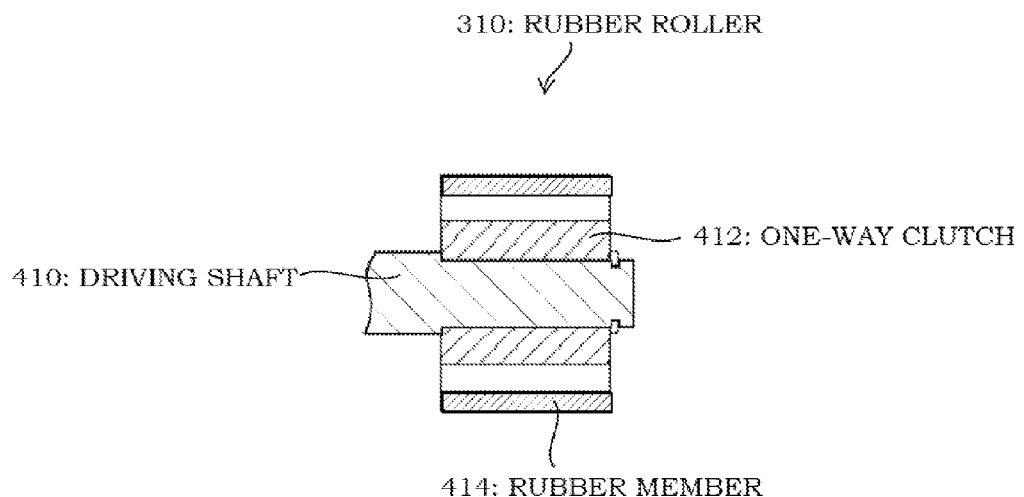
FIG. 27 is a schematic horizontal cross-sectional view illustrating a rubber roller.

FIG. 27 is a schematic horizontal cross-sectional view illustrating the rubber roller 310. As illustrated in FIG. 27, the rubber roller 310 includes a driving shaft 410 driven by rotation of the belt 318, a one-way clutch 412 provided in the outer circumference of the driving shaft 410 and drivenly rotated by the adjoining booklet 10, and a rubber member 414 provided in the outer circumference of the one-way clutch 412 to feed the booklet 10.

The rubber rollers 311 and 312 also have the same configuration as that of the rubber roller 310. In this configuration, it is possible to prevent a load from being applied to the rubber roller 310, 311, or 312, the belt 318, or the booklet 10 even when the booklet 10 is extracted by virtue of the rotational force of the rubber roller 313 and the pressing roller 308.

Operation of Feeder Unit

Figure 32:
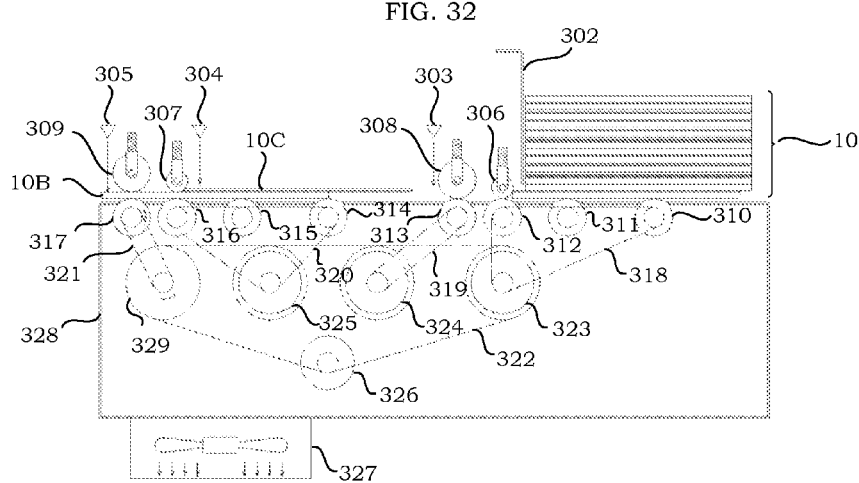
FIG. 32 is a schematic side view illustrating a feeder unit for describing an operation of the feeder unit.
Figure 33:
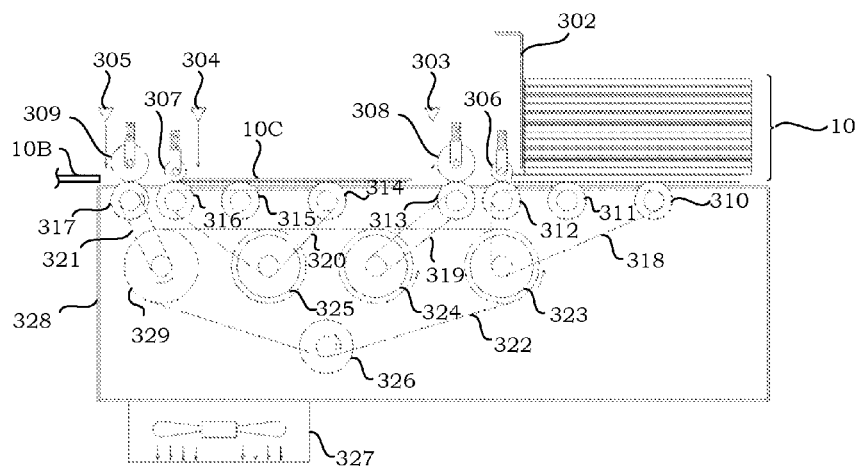
FIG. 33 is a schematic side view illustrating a feeder unit for describing an operation of the feeder unit.
Figure 34:
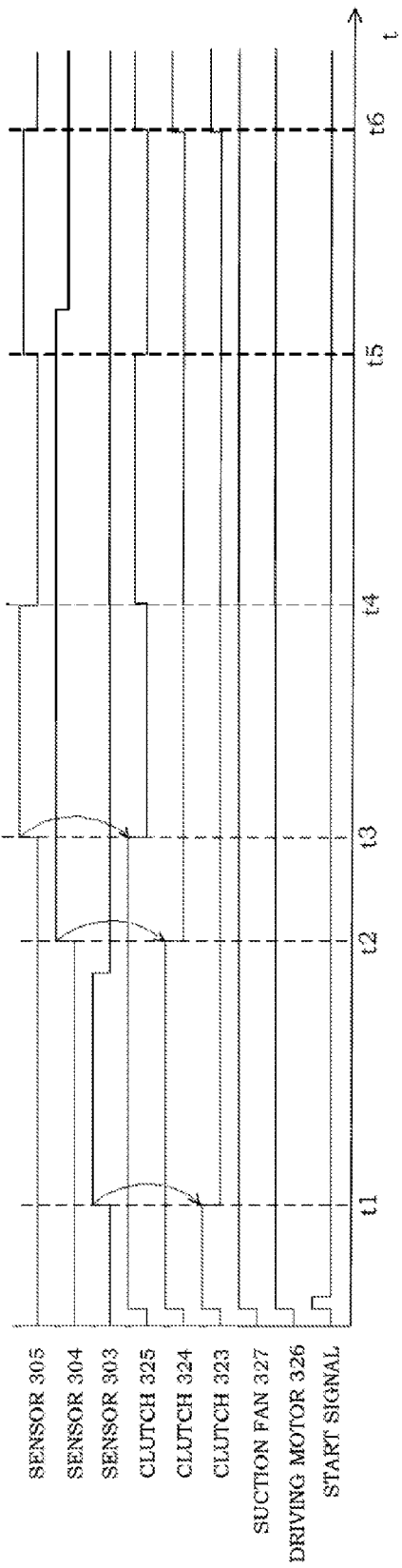
FIG. 34 is a timing chart illustrating ON-OFF timings of each part along time.

Next, a description will be made for an operation of the feeder unit 102 with reference to the schematic side views of FIGS. 28 to 33 illustrating the feeder unit 102 and the timing chart of FIG. 34 illustrating the ON/OFF operation of each part along time.

Figure 28:
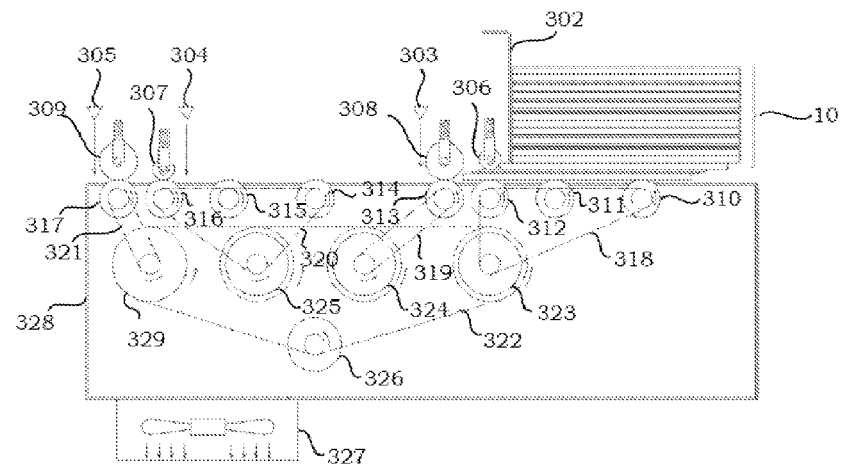
FIG. 28 is a schematic side view illustrating a feeder unit for describing an operation of the feeder unit.

First, as illustrated in FIG. 28, the booklets 10 are stacked on the feeding tray 302. In this case, each booklet 10 may have a different thickness. As an operator manipulates an operation start button (not illustrated), a start signal is output from the control unit 108 so that the driving motor 326, the electromagnetic clutches of the clutch rollers 323, 324, and 325, and the suction fan 327 are turned on as illustrated in the timing chart of FIG. 34. The belt 322 is rotated by driving the driving motor 326 so that the rotation is transmitted to the belts 318, 319, and 320 through the clutch rollers 323, 324, and 325, respectively. The rubber rollers 310, 311, and 312 are rotated by virtue of the rotation of the belt 318. The rubber roller 313 is rotated by virtue of the rotation of the belt 319. The rubber rollers 314, 315, and 316 are rotated by virtue of the rotation of the belt 320. In addition, the rubber roller 317 is rotated by virtue of the rotation of the motor 326 transmitted from the belts 322 and 321 through the roller 329.

A plurality of booklets 10 are extracted from the lower side of the feeding tray 302 by virtue of the rotation of the rubber rollers 310, 311, and 312. A plurality of the extracted booklets 10 are separated by the first retard means 306 into one or several booklets. In the following description, it is assumed that an overlapping feeding state is employed, in which a plurality of booklets are separated into two booklets by the first retard means 306.

Figure 35:
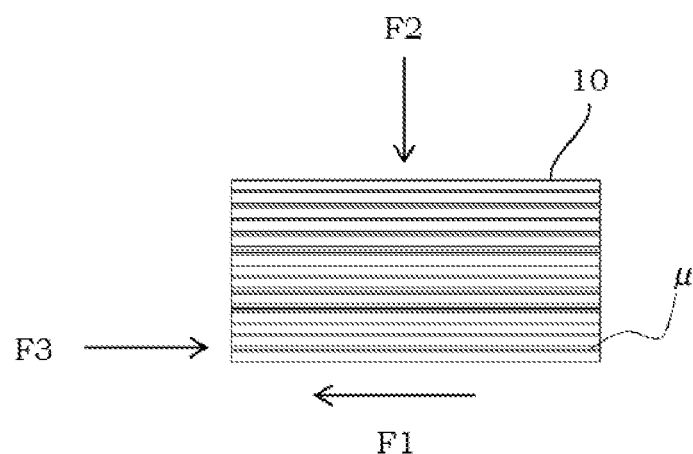
FIG. 35 is a diagram for describing a relationship between a separation force F3 for separating a single booklet located in the lowermost side out of a plurality of stacked booklets and a self-weight F2.

Here, in order to remove the overlapping feeding of the booklets 10 using the first retard means 306, a strong spring force and a strong torque are necessary in the first retard means 306. Specifically, as illustrated in FIG. 35, a separation force F3 for separating a single lowermost booklet out of a plurality of the stacked booklets 10 is expressed as "F3=μ×

F2" (where "μ" denotes a frictional coefficient, and "F2" denotes a self-weight of the overlying booklet). That is, as the number of stacked booklets increases, a stronger separation force is necessary.

In order to obtain a strong separation force using the first retard means 306, it is necessary to provide a strong spring force of the press spring 408 for generating a strong pressing force to press the booklet 10 to the rubber roller 312, a strong brake force of the torque limiter 404 for suppressing a movement of the overlapping booklets 10, and a strong feeding force for extracting a single lowermost booklet out of the booklets 10 that receive the strong spring force. However, as a separation force increases by the strong spring force and the strong torque, the booklet that receives the strong feeding force may be damaged or broken. For this reason, the separation roller 306 is set to receive a weak spring force and a weak brake force. It is noted that "F1" in the drawing denotes a feeding force applied by the rubber rollers 310, 311, and 312.

Figure 29:
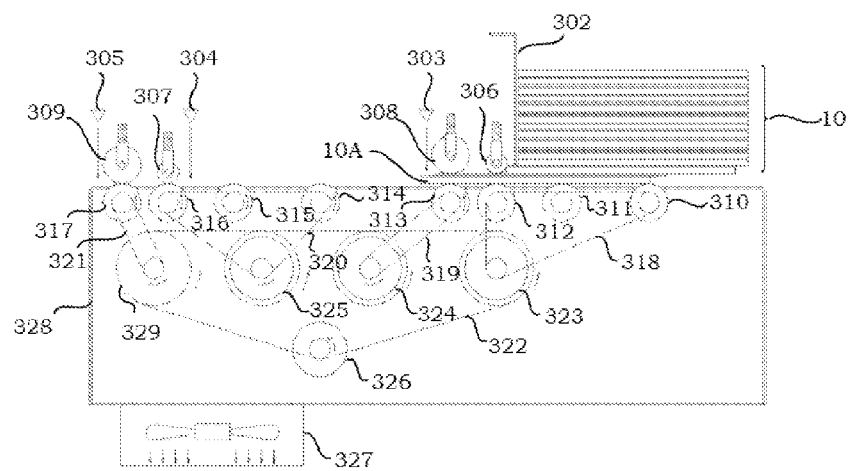
FIG. 29 is a schematic side view illustrating a feeder unit for describing an operation of the feeder unit.

As illustrated in FIG. 29, as the overlappingly fed booklets 10A arrive at the sensor 303, the sensor 303 detects arrival of the overlapping booklets 10A and the feeding location detecting means 13 and the rotation control means 12 are controlled to turn off the clutch 323 (refer to "t1" in the timing chart of FIG. 34).

The rotation of the belt 318 stops as the clutch 323 is turned off, so that the driving force for the rubber rollers 310, 311, and 312 is removed. As a result, the booklet 10 in the feeding tray 302 is not fed.

The overlappingly fed booklets 10A are extracted by the rubber roller 313 and the pressing roller 308. Here, since the one-way clutch 412 is embedded in each of the rubber rollers 310, 311, and 312, only the rubber roller adjoining the overlapping fed booklets 10A is drivenly rotated. In this manner, since there is no synchronized rotation of the rubber roller, no booklet 10 in the feeding tray 302 is fed.

Figure 30:
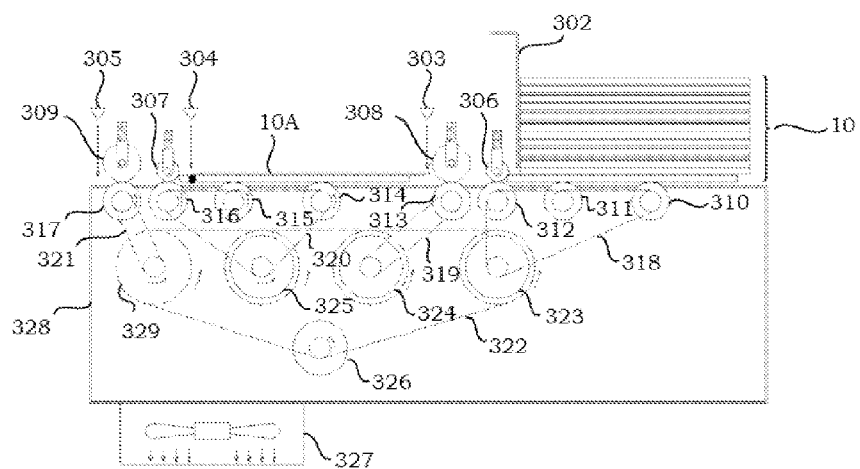
FIG. 30 is a schematic side view illustrating a feeder unit for describing an operation of the feeder unit.
Figure 31:
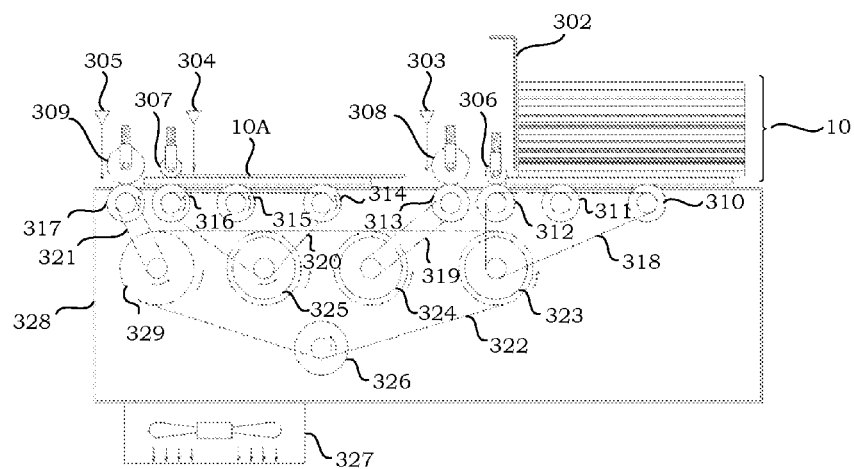
FIG. 31 is a schematic side view illustrating a feeder unit for describing an operation of the feeder unit.

As the overlapping booklets 10A are extracted by the rubber roller 313 and the pressing roller 308, the overlapping booklets 10A are not pressed by any roller or the like as illustrated in FIG. 30. This is because it is necessary to remove any roller or the like on the booklets 10A in order to separate the overlapping booklets 10A using the separation roller 307 again.

At this timing, as illustrated in the timing chart of FIG. 34, the suction fan 327 is turned on and is under operation. Therefore, the suction fan 327 sucks the overlappingly fed booklets 10A from the gaps between the housing 328 and the rubber rollers 310 to 317. Accordingly, the overlapping booklets 10A can be fed while they are attracted toward the rubber rollers 314 and 315.

As the overlapping booklets 10A arrive at the location of the sensor 304, the sensor 304 detects arrival of the overlapping booklets 10A, and the feeding location detecting means 13 and the rotation control means 12 are controlled to turn off the electromagnetic clutch of the clutch roller 324 (refer to "t2" in the timing chart of FIG. 34). As the electromagnetic clutch of the clutch roller 324 is turned off, the rotation of the belt 319 stops, and the rubber roller 313 stops.

Figure 36:
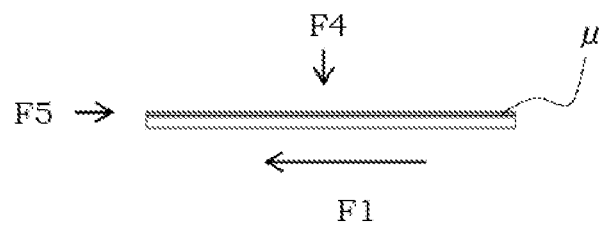
FIG. 36 is a diagram for describing a relationship between a separation force F5 for separating a single booklet located in the lowermost side out of overlappingly fed booklets and a self-weight F4.

The overlapping booklets 10A are fed to the location of the second retard means 307 by the rubber rollers 314 and 315. Therefore the overlapping booklets 10A are reliably separated one by one by the second retard means 307 (refer to FIG. 31). As illustrated in FIG. 36, a separation force F5 necessary at this timing can be expressed as "F5=μ×F4" or stronger. Since the self-weight F4 is significantly smaller than "F2" relating to a case where a plurality of booklets 10 are overlapped, the separating force F5 is remarkably reduced. Therefore, even when the second retard means 307 having a weak spring force (stronger than that of the first retard means 306) and a weak brake force is employed, it is possible to apply an appropriate grip force between the rubber roller 316 and the booklet 10 and easily separate the overlapping booklets 10A. Here, the lower booklet after separation of the overlapping booklets 10A is denoted by the booklet 10B, and the upper booklet is denoted by the booklet 10C.

The booklet 10B is fed to the rubber rollers 314, 315, 316, and 317 and arrives at the location of the sensor 305 as illustrated in FIG. 32. The sensor 305 detects the booklet 10B, and the feeding location detecting means 13 and the rotation control means 12 are controlled to turn off the electromagnetic clutch of the clutch roller 325 (refer to "t3" in the timing chart of FIG. 34).

As the electromagnetic clutch of the clutch roller 325 is turned off, the belt 220 stops, so that the driving force for the rubber rollers 314, 315, and 316 is removed, and the booklet 10C is not fed. The booklet 10B is extracted by the rubber roller 317 and the pressing roller 309. Since the one-way clutch 412 is embedded in each of the rubber rollers 314, 315, and 316, only the rubber roller adjoining the booklet 10B is drivenly rotated. In this manner, since there is no synchronized rotation of the rubber roller, the booklet 10C is not fed.

The booklet 10B is fed to the rubber roller 317 and is discharged to the page-turning unit 103 in the downstream side as illustrated in FIG. 33. In this manner, it is possible to prevent a damage to the booklet 10 generated by a strong separation force applied to the booklets 10 using a pair of retard means 306 and 307. In addition, it is possible to supply booklets 10 having any thickness one by one to the page-turning unit 103 side without specifically adjusting the setting depending on the thickness of the booklet 10. Furthermore, it is possible to reliably separate and feed the booklets 10 one by one by controlling rotation of the rubber rollers 310, 311, 312, 313, 314, 315, and 316.

When the sensor 305 is turned off, and the sensor 304 is turned on, that is, when the booklet 10 is detected, this means that a separated booklet 10 remains on the feeding path. For this reason, the electromagnetic clutch of the clutch roller 325 is turned on, and the rubber rollers 314, 315, and 316 are driven to send the remaining booklet 10 to the roller 317 side (refer to "t4" in the timing chart of FIG. 34). As the booklet 10 is detected by the sensor 305 passing through the roller 317, the electromagnetic clutch of the clutch roller 325 is turned off again (refer to "t5" in the timing chart of FIG. 34).

As the detection of overall sensors are turned off, and the booklet 10 can be fed to the page-turning unit 103, the electromagnetic clutches of the overall clutch rollers 323, 324, and 325 are turned on again, so that the feeding of the booklets 10 is resumed (refer to "t6" in the timing chart of FIG. 34).

Loader/Conveyor Unit

Next, a description will be made for a loader/conveyor unit 101. The loader/conveyor unit 101 is used when a large number of booklets 10 are processed. When the loader/conveyor unit 101 is used, the loader/conveyor unit 101 is arranged in the upstream side of the feeder unit 102 as illustrated in FIG. 1 to stack a large number of booklets 10 to be processed on the loader/conveyor unit 101.

The feeder booklet detecting means 16 detects whether or not a booklet 10 is present in the feeder unit 102 based on a signal from the booklet presence sensor 109. If the feeder booklet detecting means 16 determines that there is no booklet 10 in the feeder unit 102, the booklet supply control means 17 transmits a signal for driving the loader/conveyor unit 101 to shift the booklets stacked on the loader/conveyor unit 101 to the feeding tray 302 of the feeder unit 102.

Using the loader/conveyor unit 101 in this manner, it is possible to fully automatically acquire image data of overall pages of the booklets 10 just by stacking a large number of booklets 10 to be processed on the loader/conveyor unit 101, which is efficient.

As described above, using the page-turning reader device 1, it is possible to continuously acquire image data of each page of a plurality of the stacked booklets 10 having different thicknesses. Therefore, it is possible to remarkably reduce a work effort or time.

It is noted that the description has been made for a case where a plurality of booklets 10 are processed in the aforementioned embodiment, a continuous processing can be performed using the page-turning reader device 1 even when a single paper sheet is mixed between a plurality of booklets 10.

Figure 37:
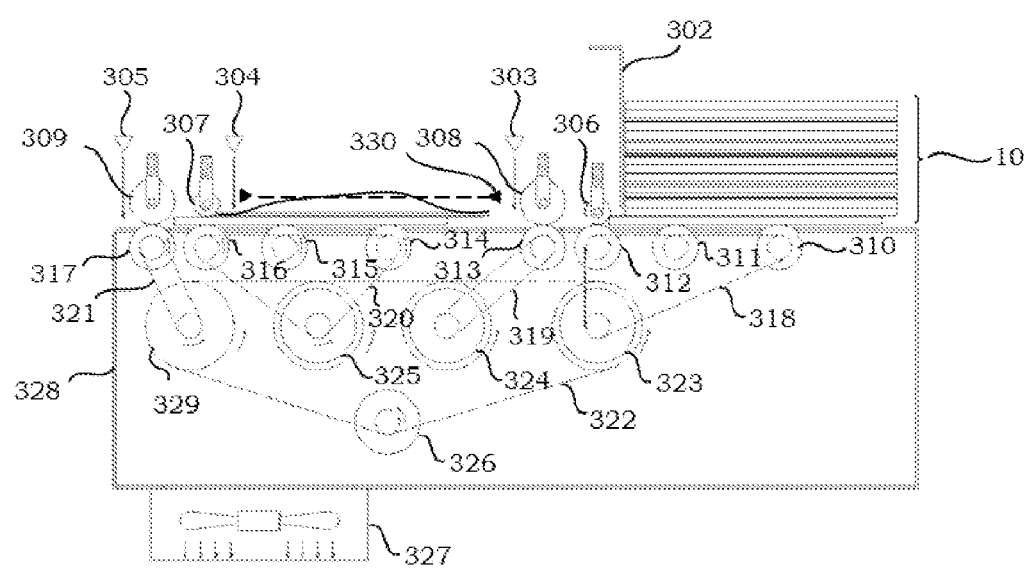
FIG. 37 is a schematic side view illustrating a feeder unit for describing detection of a reversely inserted booklet using a swelling detection sensor.

Next, a description will be made for applications of each part of the page-turning reader device according to the aforementioned embodiment. FIG. 37 illustrates a case where a swelling detection sensor 330 is provided in the feeding path of the feeder unit 102, and the sensor 305 is a height detection sensor. The swelling detection sensor 330 is a sensor provided between the pressing roller 308 and the second retard means 307. The swelling detection sensor 330 may be, for example, an optical sensor. If light irradiated from a light-emitting portion is blocked by something between the light-emitting portion and a light-receiving portion, the swelling detection sensor 330 detects it as a swelling.

If such a sensor is provided, it is possible to detect a booklet 10 having a so-called reverse insertion state in which the binding portion is arranged in the upstream side of the feeding path as illustrated in FIG. 37. If a booklet 10 is fed in a reverse insertion state, the front cover page of the booklet 10 is bent and turned over as the second retard means 307 applies a brake force (frictional force) to the surface of the booklet 10. For this reason, a distance between the light-emitting portion and the light-receiving portion is isolated, so that the swelling detection sensor 330 detects the swelling (reverse insertion).

The sensor 305 arranged in the downstream side of the pressing roller 309 to detect presence of the booklet 10 as described above may be commonly used as the height detection sensor. Here, a simple sensor capable of detecting an ON/OFF state may be used as the sensor for detecting presence of the booklet 10. Meanwhile, in order to provide a capability of detecting a height of the booklet 10, it is necessary to provide a distance measurement capability. For this reason, a laser distance measurement sensor may be employed as the sensor 305.

Figure 43:
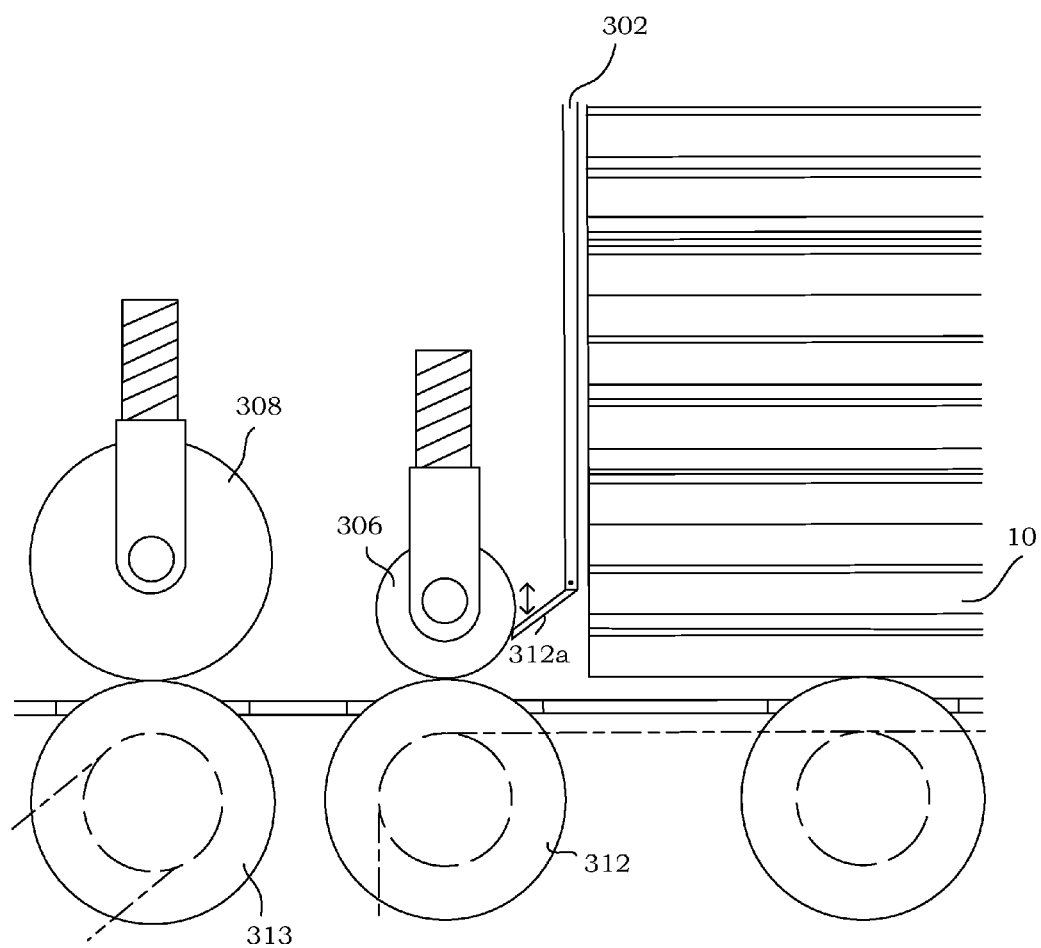
FIG. 43 is a diagram illustrating an exemplary case where a guide is provided between a feeding tray and a first retard means.

A guide 312a may be provided between the feeding tray 302 and the first retard means 306 as illustrated in FIG. 43. If such a guide 312a is provided, a leading edge of the guide 312a is lifted as the booklet 10 makes contact with the guide 312a when the booklet 10 fed from the feeding tray 302 is thick or when the number of the overlapping booklets 10 is large. A part of the leading edge of the guide 312a is arranged under the first retard means 306. For this reason, as the leading edge of the guide 312a is lifted, the first retard means 306 is also lifted. Therefore, it is possible to prevent hindrance of the lifting of the first retard means 306 as the booklet 10 collides with the side surface of the first retard means 306.

Next, an application of the page-turning unit 103 will be described. In the aforementioned embodiment, the first and second feeding belts 201 and 202 are elevated to simply press the booklet 10 to the glass panel 208 during the image capturing. However, specifically, the elevation of the first and second feeding belts 201 and 202 is preferably controlled considering a thickness of the booklet 10 gripped by the holder 203.

Figure 38:
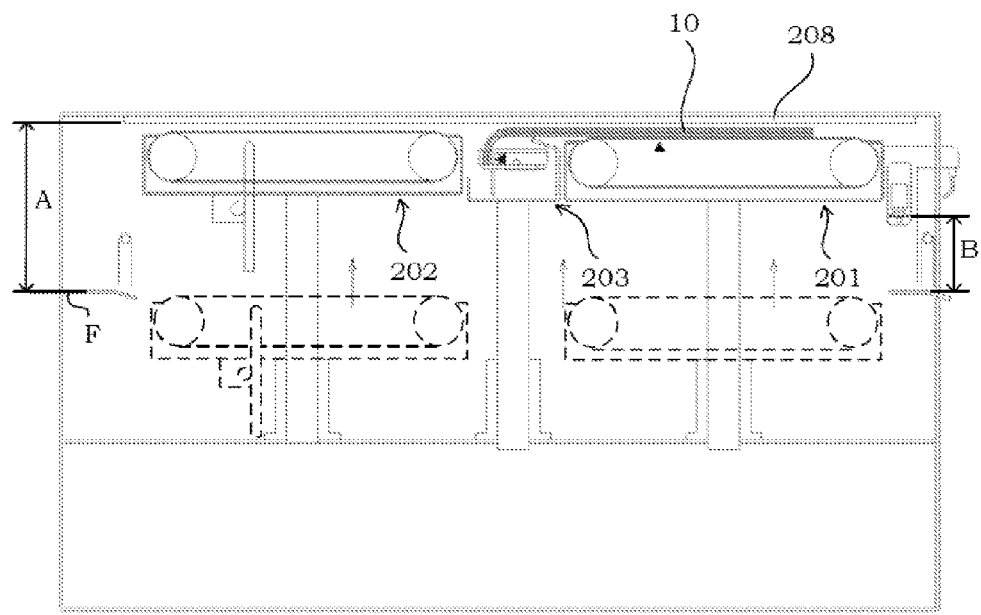
FIG. 38 is a schematic side view illustrating the page-turning unit for describing an elevating operation of first and second feeding belt units of the page-turning unit.

Specifically, as illustrated in FIG. 38, assuming that a distance from the feeding path F to the glass panel 208 is denoted by "A," a distance from the feeding path F to the air suction pad 206 is denoted by "B", and a thickness of the booklet 10 detected by the sensor 305 is denoted by "a," an elevation distance $\alpha$ of the first feeding belt 201 at the first try becomes "A-a" considering the thickness of the booklet 10. Meanwhile, an elevation distance $\beta$ of the second feeding belt 202 at the first try becomes "A" without considering the thickness of the booklet 10.

Figure 39:
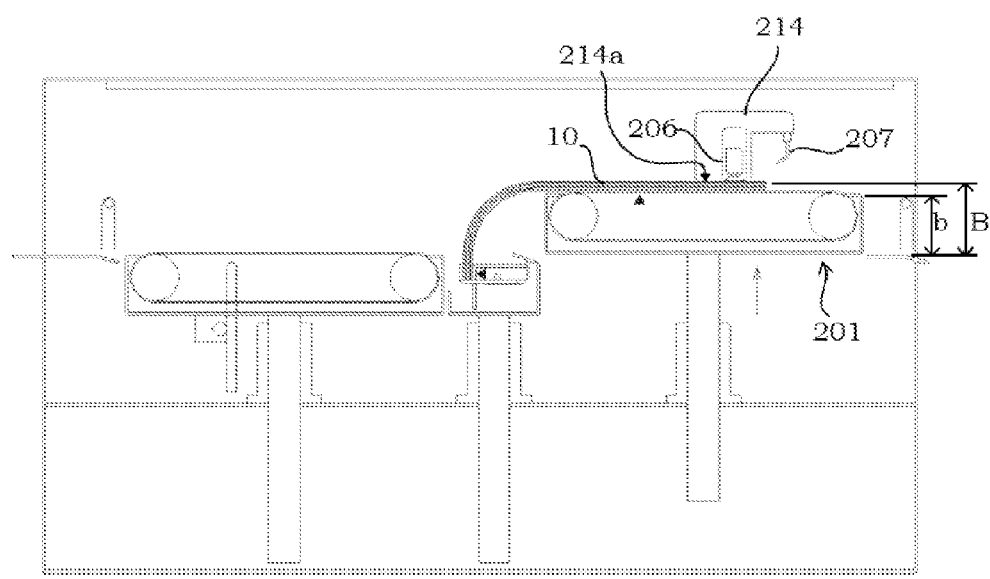
FIG. 39 is a schematic side view illustrating the page-turning unit for describing the elevating operation of the first and second feeding belt units of the page-turning unit.

As illustrated in FIG. 39, the first feeding belt 201 is elevated to press the booklet 10 to the air suction pad 206 when a page is turned. Assuming that the elevation distance of the first feeding belt 201 is denoted by "b," the elevation distance $\alpha'$ of the first feeding belt 201 at the second and subsequent tries can be expressed as "A−(B−b)." Meanwhile, the elevation distance $\beta'$ of the first feeding belt 202 at the second and subsequent tries is expressed as "$\alpha'$+{a−(B−b)}."

If such a control is performed, it is possible to stably perform the pressing to the glass panel 208 to clearly acquire the captured image data even when the booklet 10 is thick. It is noted that a proximity detection sensor 214a for detecting proximity of the air suction pad 206 is provided in the vicinity of the air suction pad 206, and the elevation distance b is set to a distance to a location where a detection signal from the proximity detection sensor 214a is output. In addition, mathematically, the distance control described above generates an error by a single page in the elevation distance. However, considering a change of the thickness caused by an air layer between pages, there is no need to consider such an error.

Figure 40:
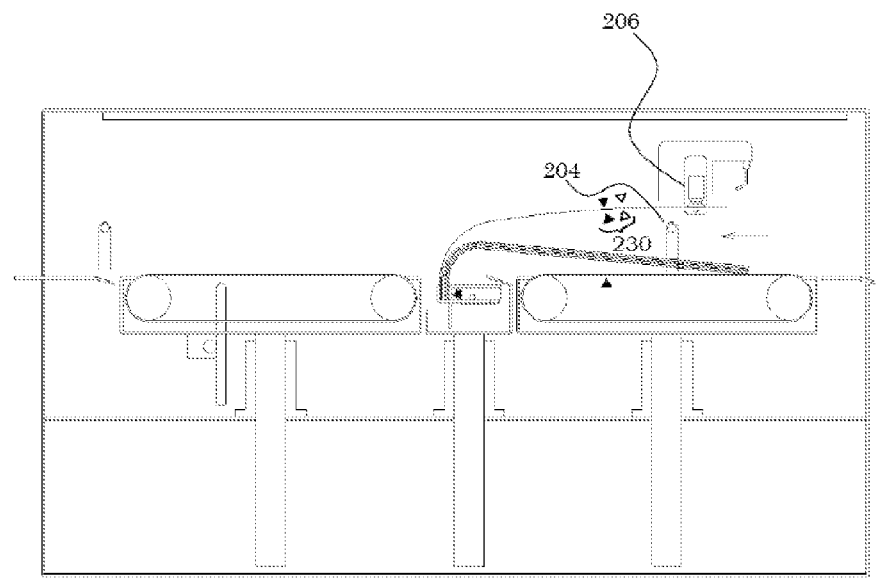
FIG. 40 is a schematic side view illustrating the page-turning unit for describing a method of preventing a two-page turning.

In the aforementioned embodiment, the swing operation of the air suction pad 206 and the air blow from the air blow nozzle 207 performed during the page-turning prevent a multi-page turning. However, in order to reliably prevent the multi-page turning, a multi-page turning prevention sensor 230 may also be provided (refer to FIG. 40).

The multi-page turning prevention sensor 230 determines whether or not the page to be turned is a single page by detecting a thickness of the page or the number of pages sucked by the air suction pad 206. It is noted that the sucking of the air suction pad 206 is performed again if it is determined that a plurality of pages are sucked.

As the multi-page turning prevention sensor 230, an ultrasonic sensor or a transmission type sensor may be used. Preferably, such sensors are used in combination. For example, when the transmission type sensor is used solely, and a dual page printing type booklet is employed, it is difficult to clearly determine whether or not a single page is captured based on an opening state of the binding. Meanwhile, in the case of the ultrasonic sensor, if two sheets are detected, it can be determined that a single page is captured without depending on the opening state of the binding portion (when pages of the booklet are set to a dual page printing type). For this reason, it is possible to reliably prevent the multi-page turning by combining a plurality of sensors for detection.

Figure 41:
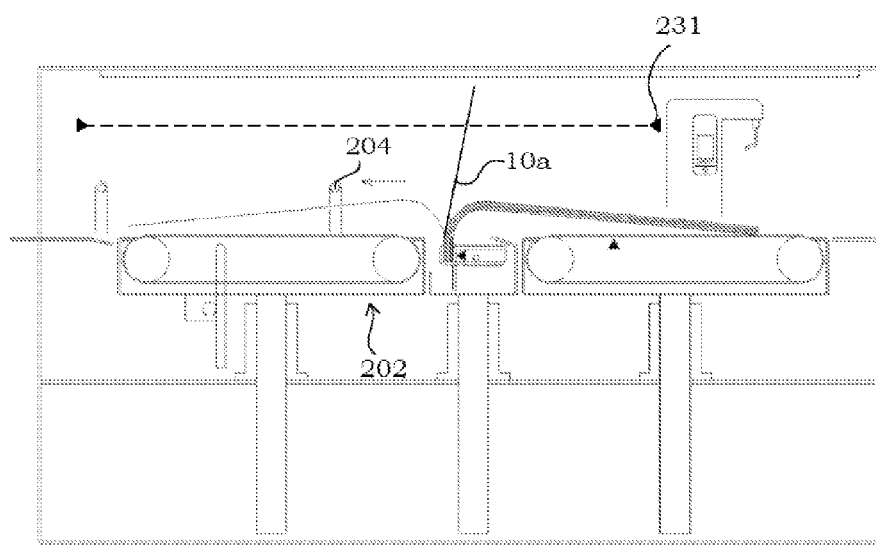
FIG. 41 is a schematic side view illustrating the page-turning unit for describing detection of initiation of an inserted page.

When a sheet having a different size is inserted between pages of the booklet 10, only the inserted page 10a may be erected as illustrated in FIG. 41. For this reason, the page-turning unit 103A may be provided with an insertion detection sensor 231 for detecting a start of the inserted page 10a. Similar to the swelling detection sensor 330, the insertion detection sensor 231 may be an optical sensor having a light-emitting portion and a light-receiving portion.

Figure 42:
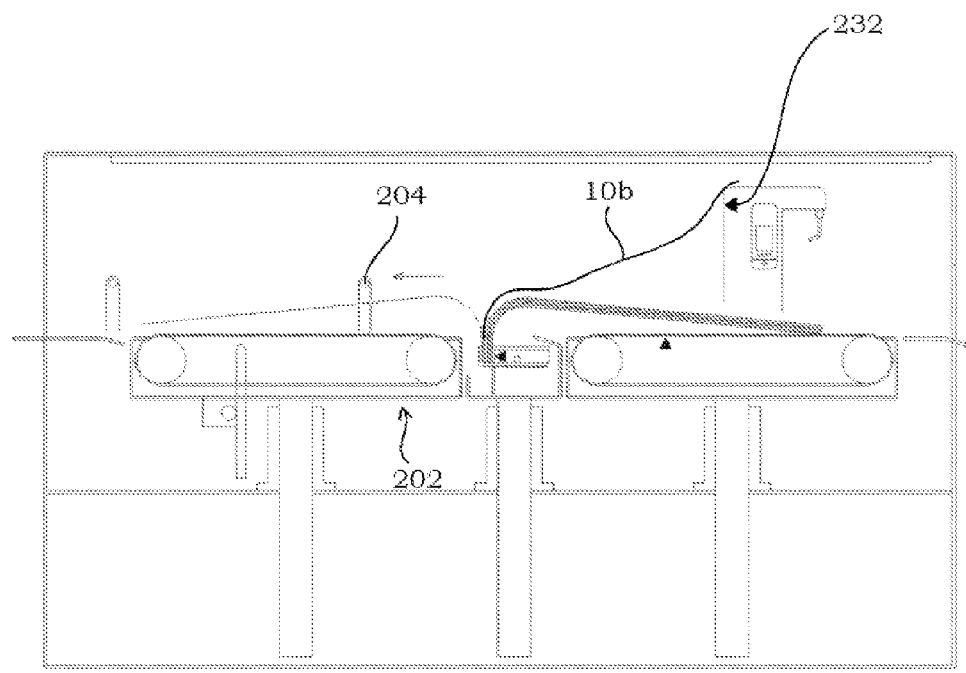

A sensor for detecting a failure of the page-turning may also be provided in a traveling direction of the support member 214 (refer to FIG. 42). Specifically, the turned page 10b may hang over in the traveling direction of the support member 214 due to a failure of the page-turning. In this case, the sensor 232 may be provided in the traveling direction of the support member 214. As a sensor 232, a proximity sensor and the like may be provided. By providing such a sensor, it is possible to suppress a danger of generating an overlapping image capturing for the same page or a page folding.

REFERENCE SIGNS AND NUMERALS 1 page-turning reader device
101 loader/conveyor unit
102 feeder unit
103, 103 A page-turning unit
104 unsuccessful booklet stack unit
105 successful booklet stack/conveyor unit
106 image pickup camera
107 LED illumination
108 control unit
109 booklet presence sensor
11 image data acquiring means
12 rotation control means
13 feeding location detecting means
14 abnormality detecting means
15 abnormality processing means
16 feeder booklet detecting means
17
201 first feeding belt unit
202 second feeding belt unit
203 holder
204 first page-turning bar
205 second page-turning bar
206 air suction pad
207 air blow nozzle
208 glass panel
209 slide guide
210 sensor
211 sensor
212 holding claw
213 holding claw rotation shaft
214 support member
215 rotation shaft
216 support bar
217 support member
218 booklet pushup bar
302 feeding tray
303, 304, 305 sensor
306 first retard means
307 second retard means
308, 309 pressure roller
310, 311, 312, 313, 314, 315, 316, 317 rubber roller
318, 319, 320, 321, 322 belt
323, 324, 325 clutch
326 driving motor
327 suction fan
328 housing
329 roller

The invention claimed is:

1. A page-turning reader device that reads each page of a booklet obtained by binding one-side edges of a plurality of overlapping pages, comprising:
a feeder unit that feeds a plurality of stacked booklets one by one from a lower side;
a booklet holder that grips and fixes a binding edge of the booklet fed from the feeder unit;
a page-turning means that turns pages of the booklet one by one while the booklet holder fixes the booklet; and
an image data acquiring means that acquires image data of each page of the booklet in synchronization with a turning operation of the page-turning means, wherein the booklet holder has a holding claw that grips the binding edge of the booklet arranged on a plane and is turned to direct the other edge of the booklet to the image data acquiring means side.

2. The page-turning reader device according to claim 1, further comprising:
first and second feeding belt units for placing and feeding the booklet provided in upstream and downstream sides, respectively, of the holder, wherein the booklet holder and the first and second feeding belt units are independently operable;
a control unit for controlling the booklet holder, a first feeding belt unit, and a second feeding belt unit; and
a sensor configured to determine whether or not the booklet is present, the sensor being arranged in the first feeding belt unit, wherein
the control unit drives the second feeding belt unit by having the booklet holder release the booklet when the sensor stops detecting the booklet in the state where the booklet holder is fixing the booklet, and conveys the next booklet to the said feeder unit.

3. The page-turning reader device according to claim 2, wherein a transparent flatbed is provided in a position facing the holder and the first and second feeding belt units, and
the image data acquiring device acquires the image data while the booklet holder and the first and second feeding belt units relatively approaches the flatbed, and the booklet is pressed by the flatbed.

4. The page-turning reader device according to claim 1, wherein the feeder unit includes:
a feeding tray where the plurality of booklets are stacked;
a feeder device that extracts and feeds the booklet from a lower side of the plurality of booklets stacked on the feeding tray; and
a retard device that separates the booklets overlappingly extracted from the lower side of the plurality of booklets, wherein
the feeder unit includes a first feeder that feeds the booklet to the retard means, and a second feeder that feeds the booklet discharged from the retard means, and
the control unit controllably turns off the driving of the first feeder when the second feeder conveys the booklet.

5. The page-turning reader device according to claim 4, wherein the retard device is a rubber roller having a torque limiter.

6. The page-turning reader device according to claim 4, wherein the feeder unit has a plurality of rubber rollers and a rotation controller that controls rotation of the plurality of rubber rollers using a plurality of electromagnetic clutches.

7. The page-turning reader device according to claim 6, further comprising a feeding location detector that detects a feeding location of the booklet, and the rotation controller performs an ON/OFF control for the plurality of electromagnetic clutches based on the feeding location of the booklet detected by the feeding location detector.

8. The page-turning reader device according to claim 4, wherein the feeder device has a one-way clutch drivenly rotated by an adjoining booklet.

9. The page-turning reader device according to claim 4, further comprising an air suction device that sucks air to attract the fed booklet toward the feeder device.

10. The page-turning reader device according to claim 1, further comprising:

an abnormality detecting means that detects abnormality in the image data acquired by the image data acquiring means;

an abnormality processing means that discharges, to a unsuccessful booklet stack tray, a booklet having the abnormality when the abnormality detecting means detects the abnormality in the image data;

a booklet pushup bar that pushes up the portion of the booklet turned over with the page-turning means; and a second page-turning bar that returns the pushed up portion of the booklet to the original state previous to the page-turning, wherein the abnormality detecting means controls discharging of the booklet to the unsuccessful booklet stack tray after operating the booklet pushup bar and the second page turning bar.

11. The page-turning reader device according to claim 1, further comprising:

a loader/conveyor unit where a plurality of booklets are stacked;

a feeder booklet detector that detects whether or not a booklet is present in the feeder unit; and a booklet supply controller that operates the loader/conveyor unit to shift the stacked booklets to the feeder unit when the feeder booklet detector determines that no booklet is present in the feeder unit.

12. The page-turning reader device according to claim 1, wherein first and second feeding belt units capable of placing and feeding the booklet are provided in upstream and downstream sides, respectively, of the holder, and the holder and the first and second feeding belt units are independently operable.

13. The page-turning reader device according to claim 12, further comprising a transparent flatbed arranged to face the booklet holder and the first and second feeding belt units, and the image data acquiring device acquires the image data while the booklet holder and the first and second feeding belt units relatively approaches the flatbed, and the booklet is pressed by the flatbed by causing.

14. A page-turning reader device comprising:

a booklet holder that holds a binding edge of an inserted booklet and maintains a predetermined gripping pressure applied to the inserted booklet;

a page-turning device that turns pages of the booklet one by one while the booklet is arranged in the booklet holder; and an image data acquiring device that acquires image data of each page of the booklet in synchronization with a page-turning operation of the page-turning device, wherein the booklet holder has a holding claw that grips the binding edge of the booklet arranged on a plane and is turned to direct the other edge of the booklet toward the image data acquiring device.

15. A feeder device comprising:

a feeding tray where a plurality of booklets are stacked;

a feeding path having a feeding means that extracts and feeds the plurality of booklets stacked on the feeding tray from a lower side of the stack; and a retard device that separates overlappingly extracted booklets by pressing a top surface of the overlapping booklets, wherein the retard device are provided in at least two places on the feeding path, the feeder unit includes a first feeder that feeds the booklet to the retard means, and a second feeder that feeds the booklet discharged from the retard device, and the control unit controllably turns off the driving of the first feeder when the second feeder conveys the booklet.

16. The page-turning reader device according to claim 15, wherein the retard device are arranged in at least two places, and a distance between the retard means is longer than a length of the booklet.

17. The feeder device according to claim 15, wherein a pressing force for separation is strengthened stepwise from the retard device provided in the upstream side of the feeding path to the retard device provided in the downstream side.

18. The feeder device according to claim 15, wherein a swelling detection sensor that detects an obstacle having a height equal to or larger than a thickness of the fed booklet is provided on the feeding path between the plurality of retard device.

* * * * *